Figure 1:
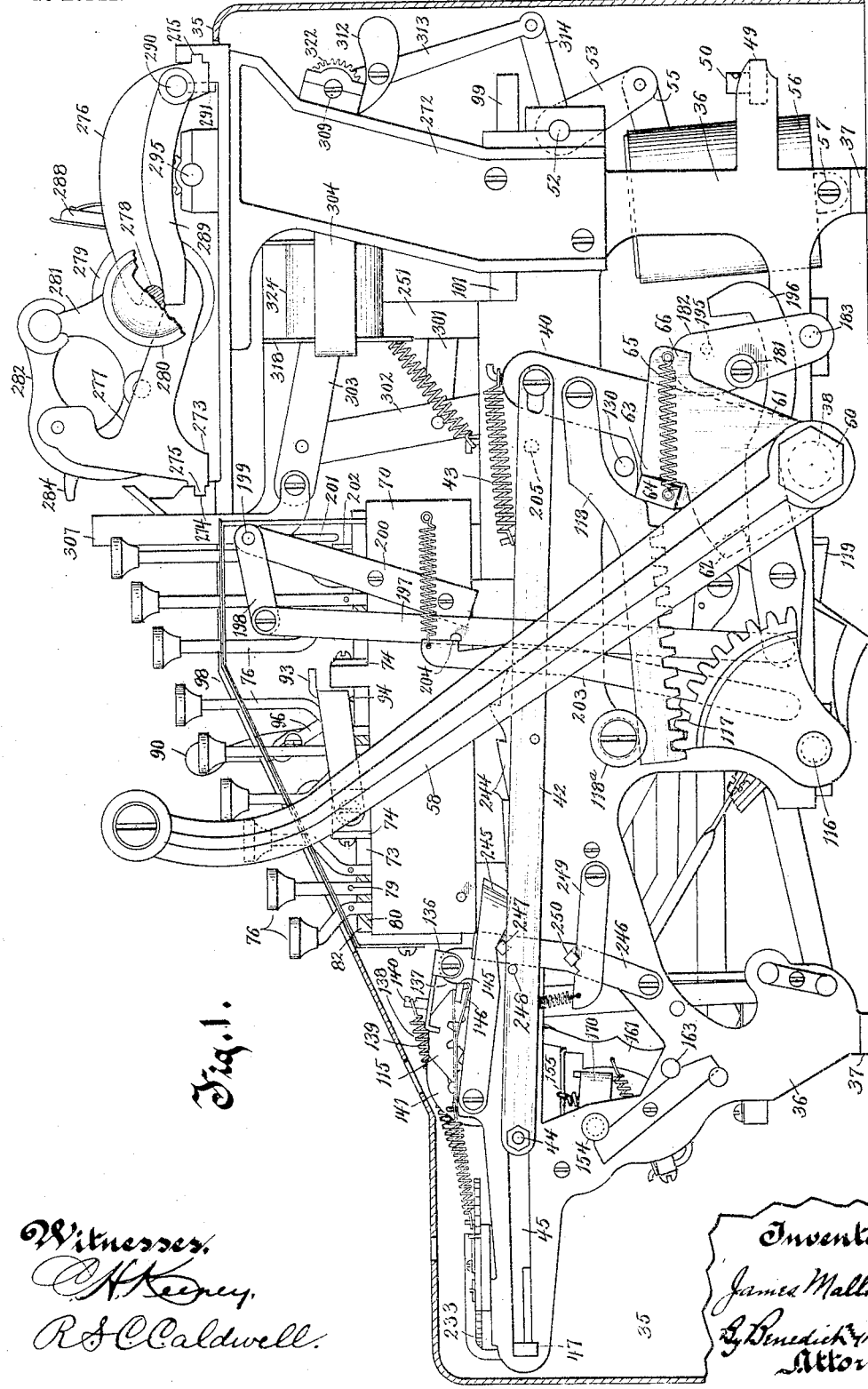

No. 777,797. PATENTED DEC. 20, 1904.
J. MALLMANN.
CALCULATING MACHINE.
APPLICATION FILED OCT. 12, 1903.
NO MODEL. 13 SHEETS—SHEET 1.

Witnesses.
H. Keeney.
R. S. C. Caldwell.

Inventor.
James Mallmann.
G. Benedict & Morsell.
Attorneys.

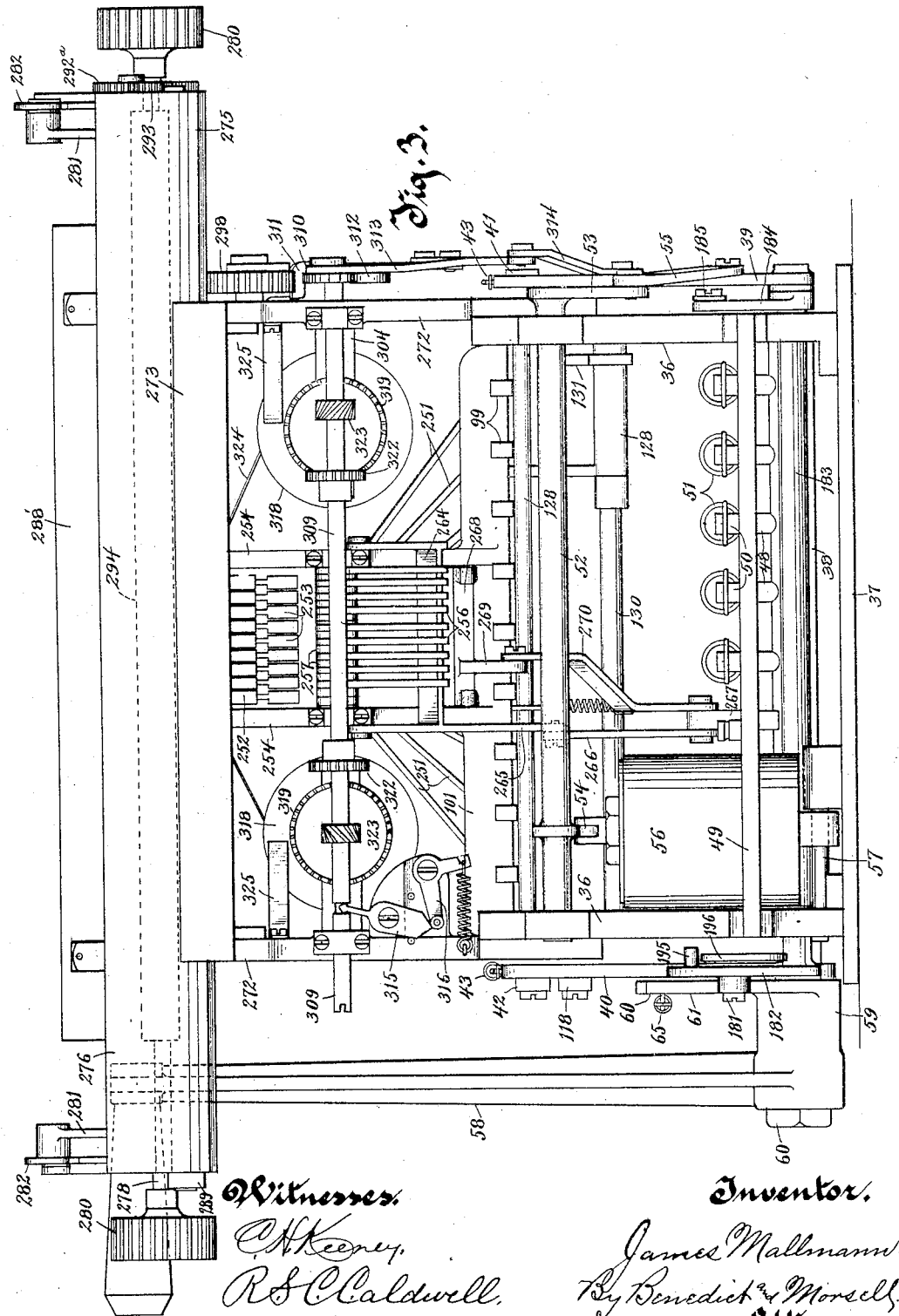

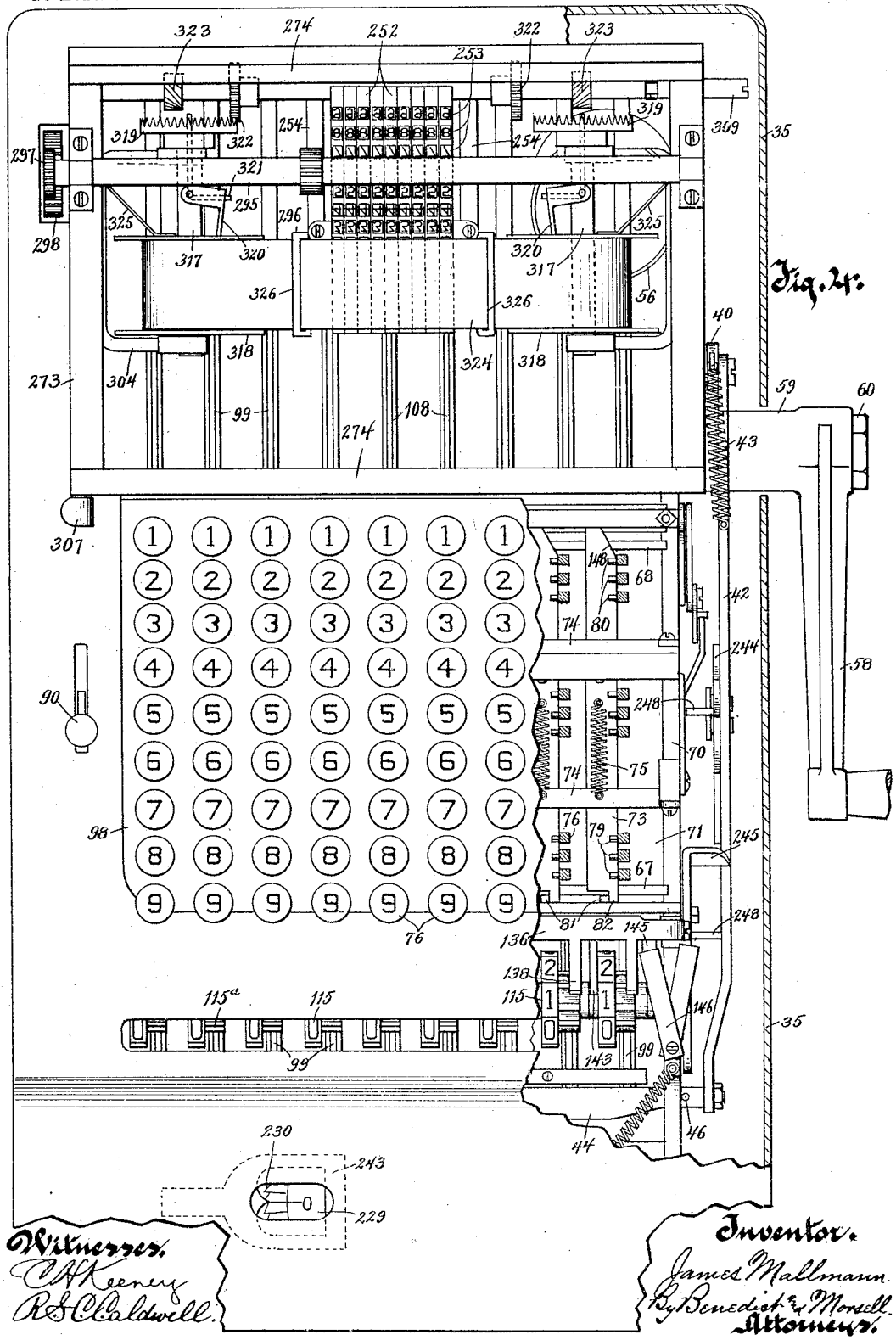

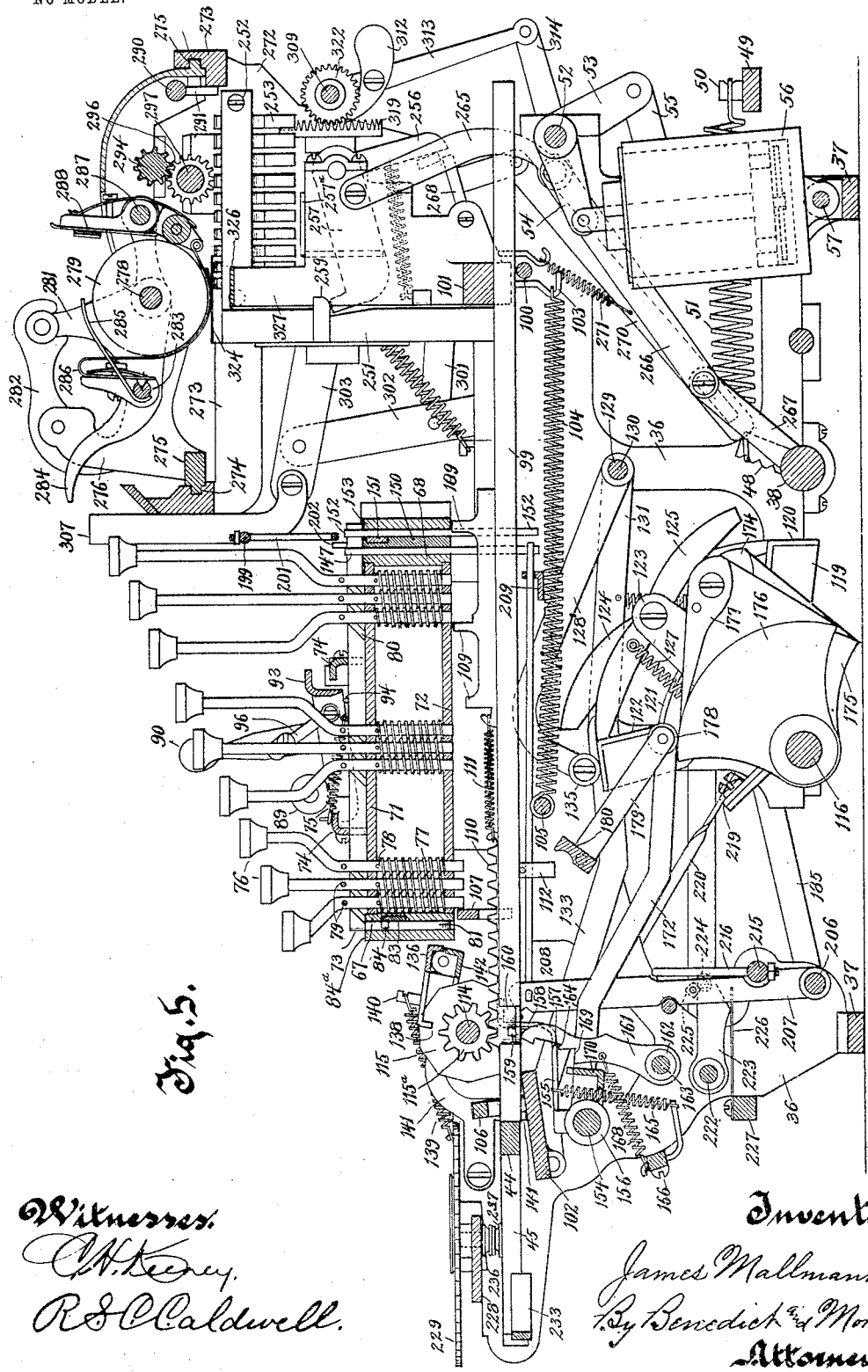

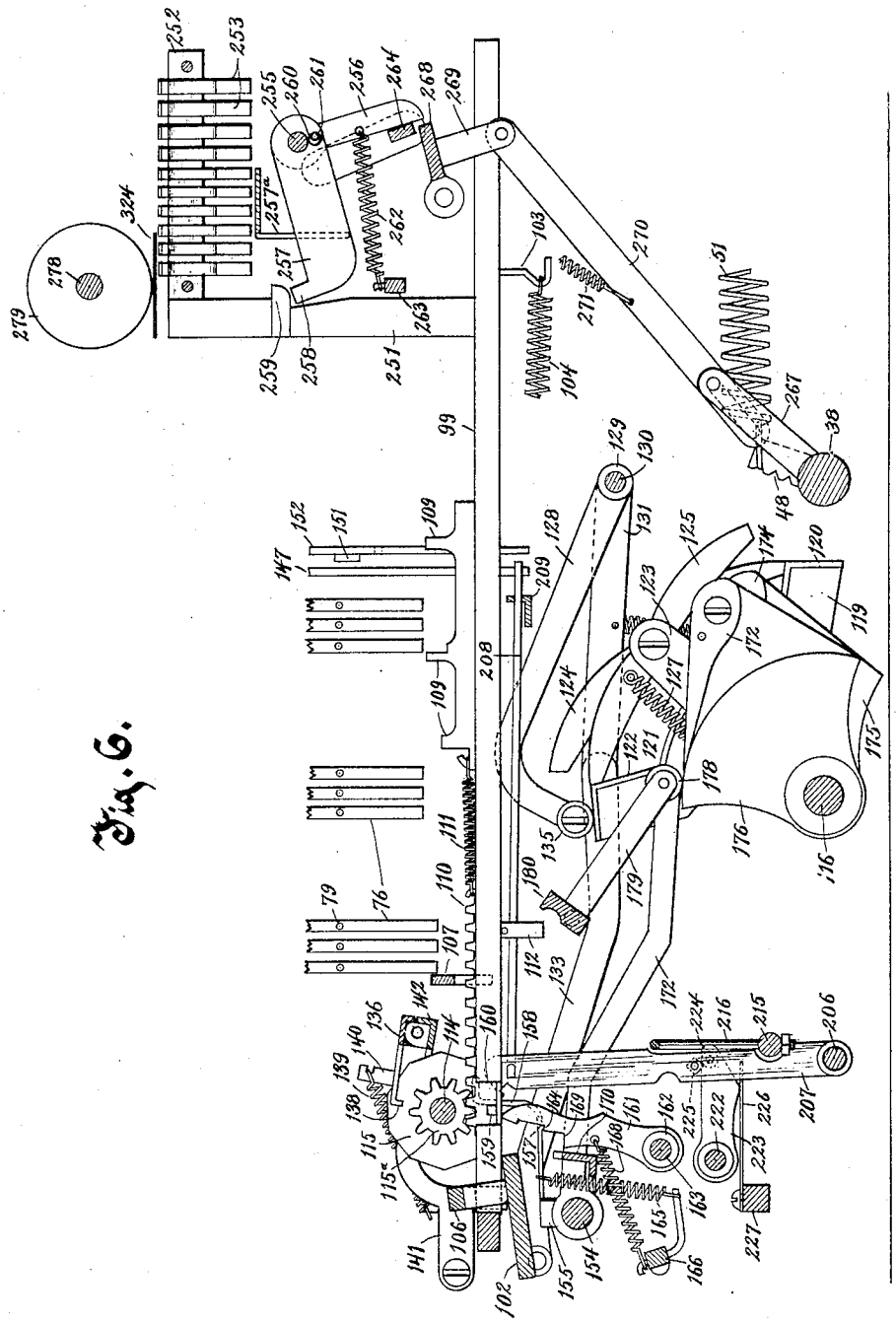

No. 777,797. PATENTED DEC. 20, 1904.
J. MALLMANN.
CALCULATING MACHINE.
APPLICATION FILED OCT. 12, 1903.
NO MODEL. 13 SHEETS—SHEET 7.
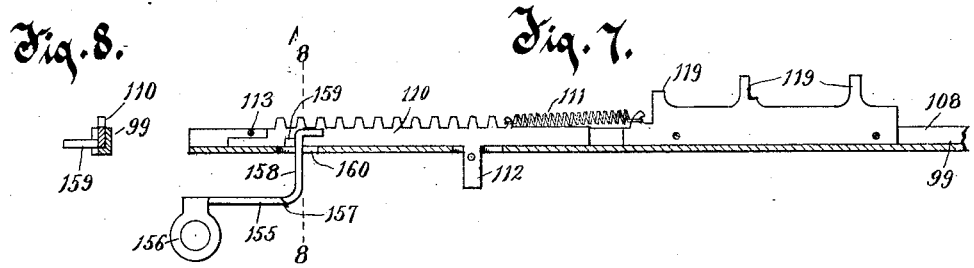
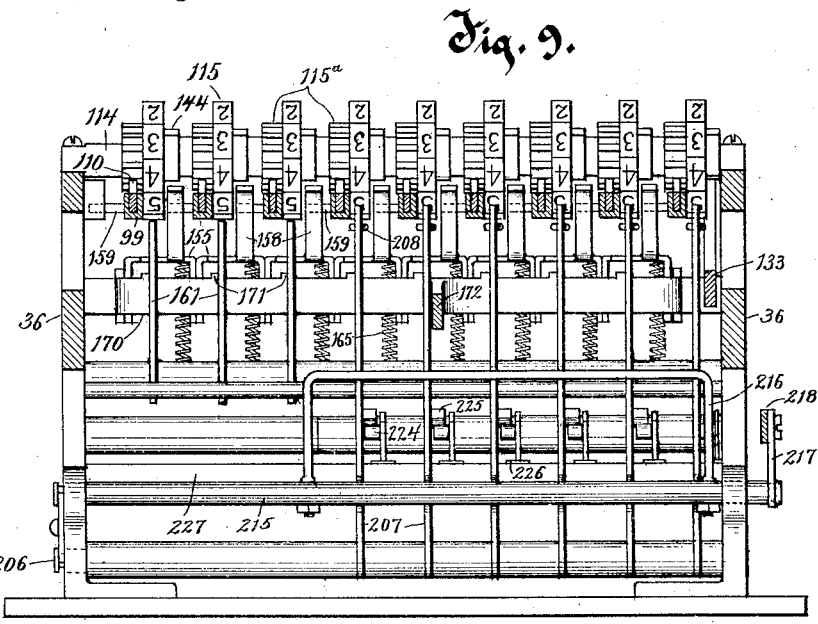
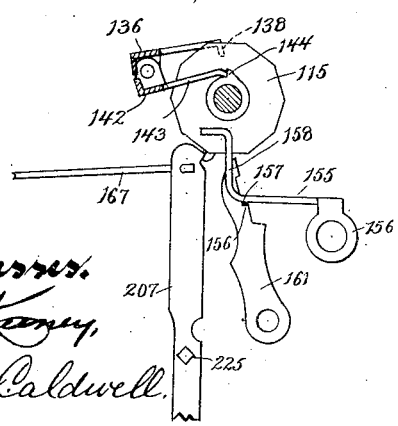
Witnesses.
C. H. Keney,
R. S. C. Caldwell.
Inventor.
James Mallmann
By Benedict and Morsell
Attorneys.

No. 777,797. PATENTED DEC. 20, 1904.
J. MALLMANN.
CALCULATING MACHINE.
APPLICATION FILED OCT. 12, 1903.
NO MODEL. 13 SHEETS—SHEET 8.

Witnesses.
C. H. Keeney.
R. S. C. Caldwell.

Inventor.
James Mallmann
By Benedick and Morsell
Attorneys.

No. 777,797. PATENTED DEC. 20, 1904.
J. MALLMANN.
CALCULATING MACHINE.
APPLICATION FILED OCT. 12, 1903.
NO MODEL. 13 SHEETS—SHEET 9.

Witnesses.
C. N. Keeney
R. S. C. Caldwell

Inventor.
James Mallmann
By Benedict & Morsell
Attorneys.

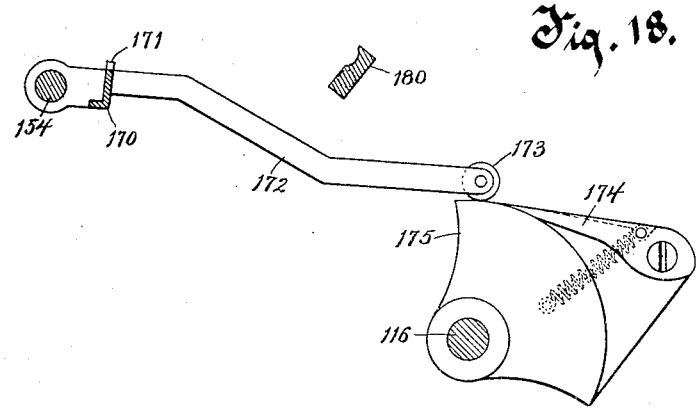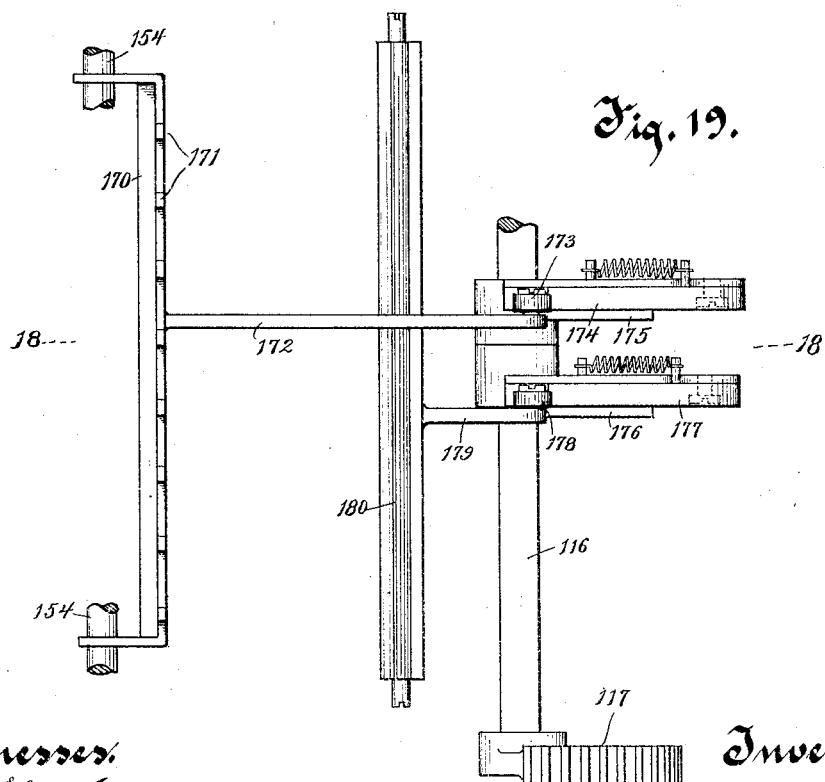

No. 777,797. PATENTED DEC. 20, 1904.
J. MALLMANN.
CALCULATING MACHINE.
APPLICATION FILED OCT. 12, 1903.
NO MODEL. 13 SHEETS—SHEET 11.
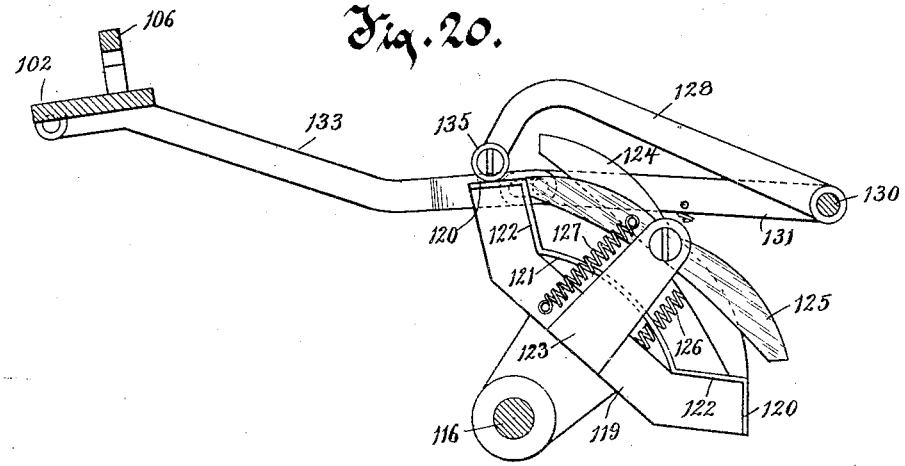
Fig. 20.
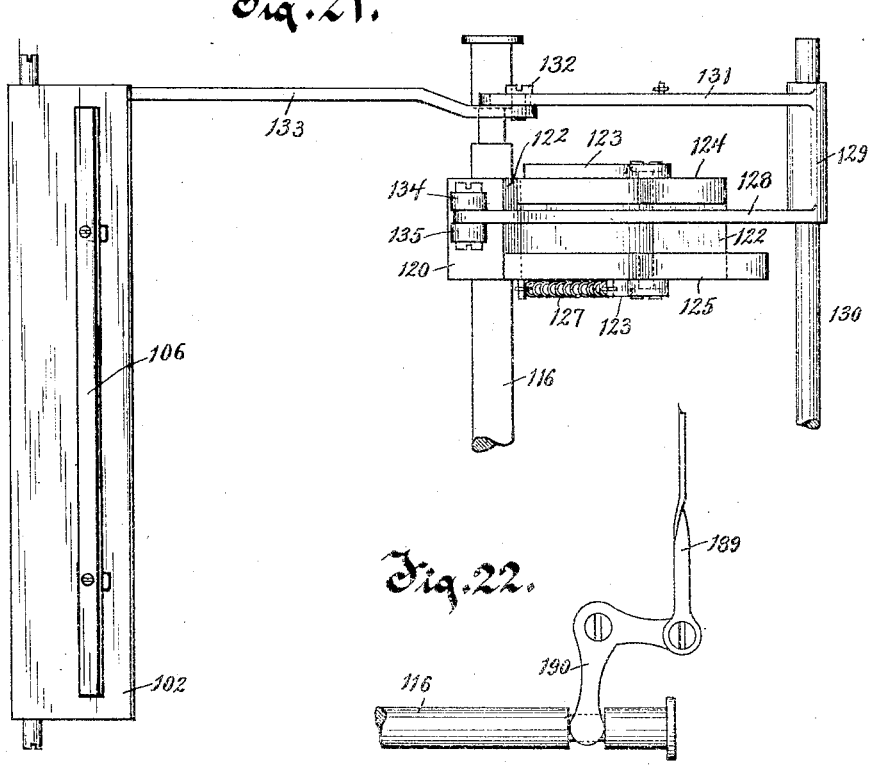
Fig. 21.
Fig. 22.
Witnesses. Inventor.

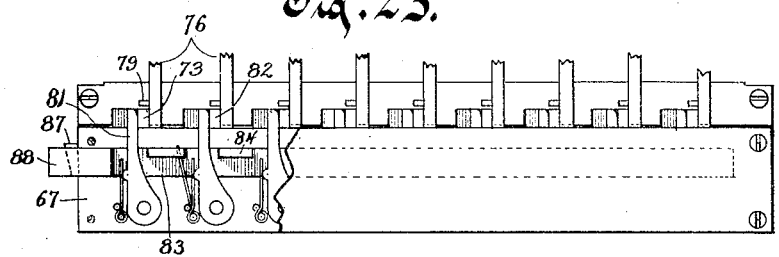
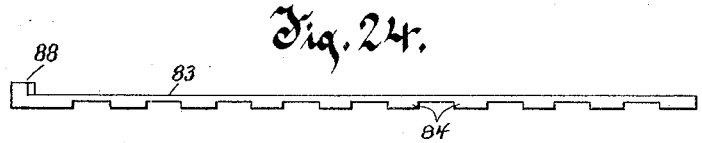
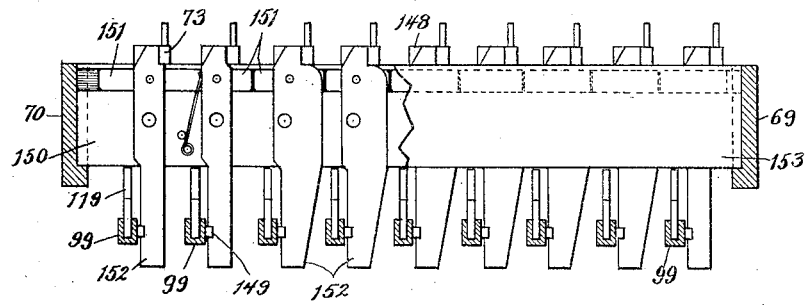
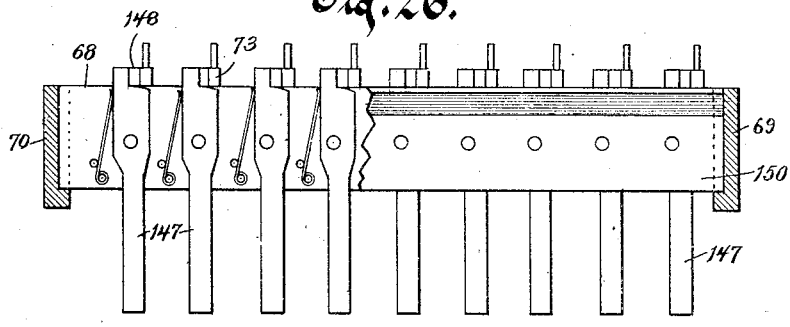

No. 777,797. PATENTED DEC. 20, 1904.
J. MALLMANN.
CALCULATING MACHINE.
APPLICATION FILED OCT. 12, 1903.
NO MODEL. 13 SHEETS—SHEET 13.

Witnesses.
C. H. Keeney.
R. S. Caldwell.

Inventor.
James Mallmann
By Benedict and Morsell
Attorneys.

No. 777,797.                                                                                          Patented December 20, 1904.

UNITED STATES PATENT OFFICE.

JAMES MALLMANN, OF SHEBOYGAN, WISCONSIN.

CALCULATING-MACHINE.

SPECIFICATION forming part of Letters Patent No. 777,797, dated December 20, 1904.

Application filed October 12, 1903. Serial No. 176,778.

*To all whom it may concern:*

Be it known that I, JAMES MALLMANN, residing at Sheboygan, in the county of Sheboygan and State of Wisconsin, have invented a new and useful Improvement in Calculating-Machines, of which the following is a description, reference being had to the accompanying drawings, which are a part of this specification.

My invention relates to certain new and useful improvements in calculating-machines, and has for its object to reduce to a minimum the manipulating parts used in the operation of the machine.

A further object is to provide an automatic indicator to show the number of items added or listed automatically without the necessity of setting or resetting the indicator.

This invention has as other objects the provision of improved working parts for accomplishing the above objects and the insuring of an absolutely perfect operation of the machine, notwithstanding carelessness or inexperience of the operator.

With the above primary and other incidental objects in view the invention consists of the devices and parts or their equivalents, as hereinafter set forth.

Figure 2:
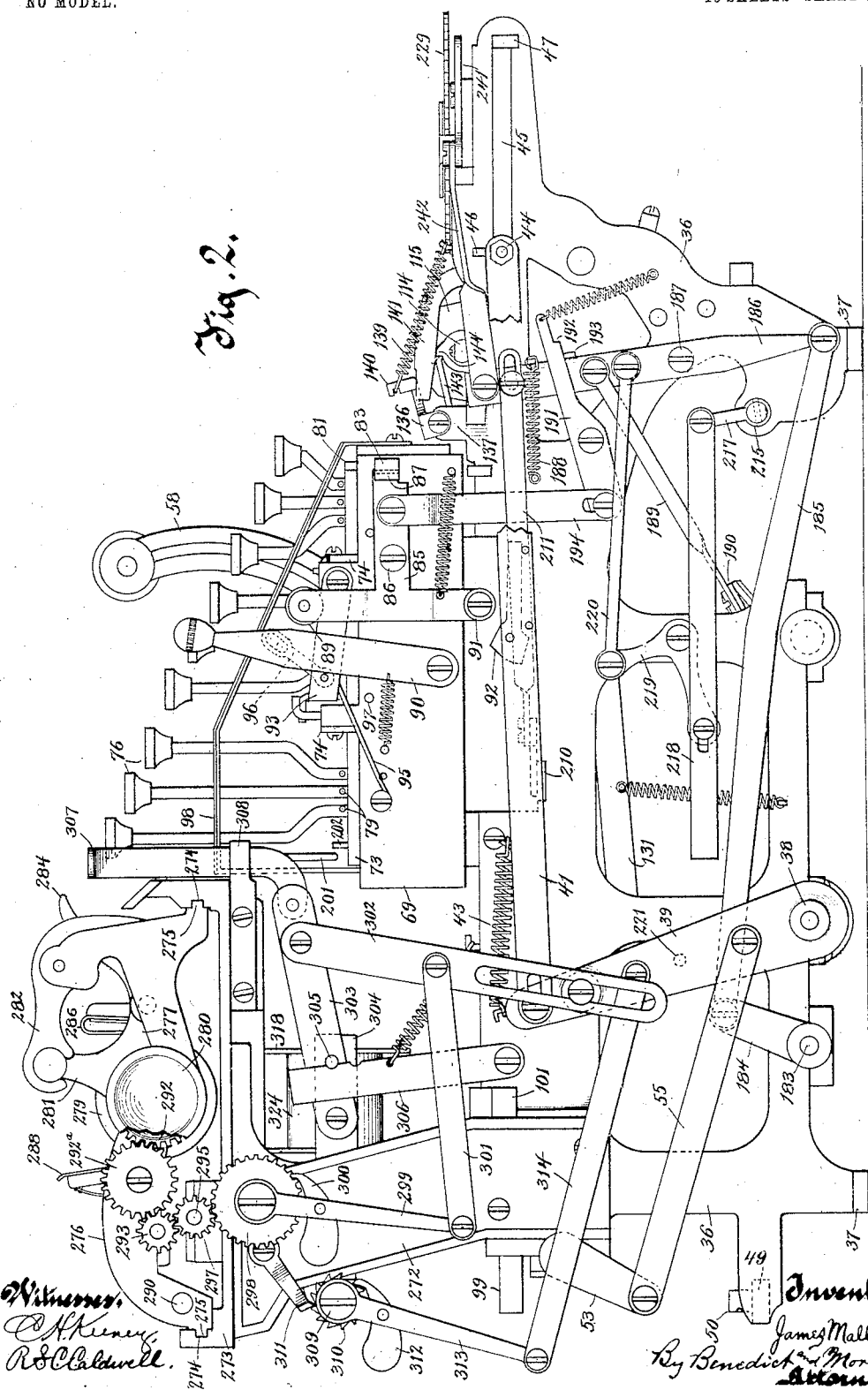
Figure 12:
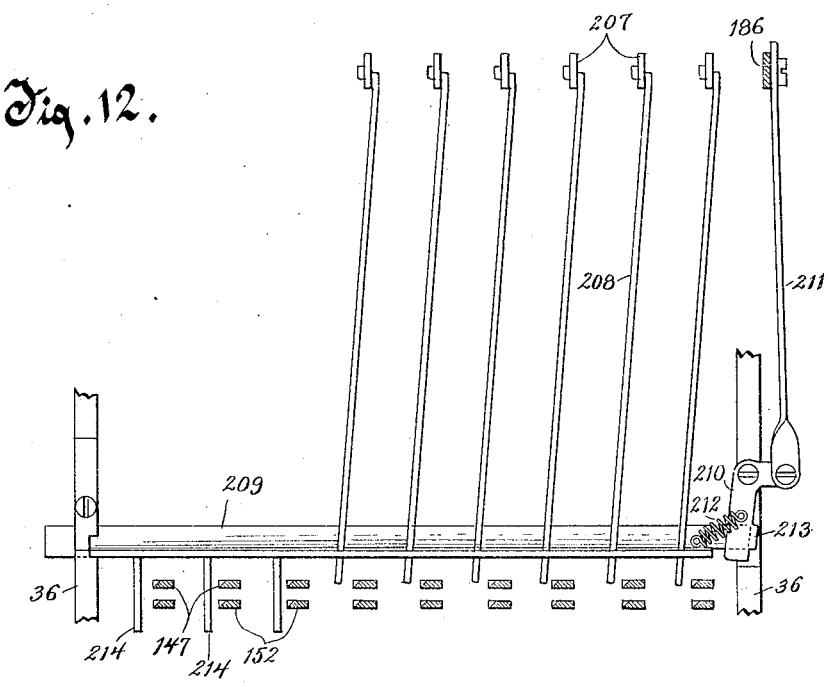
Figure 13:
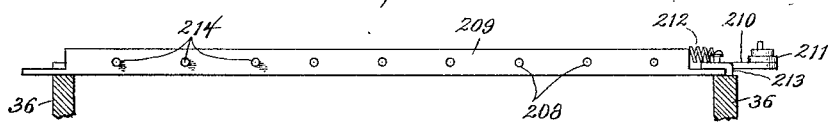
Figure 14:
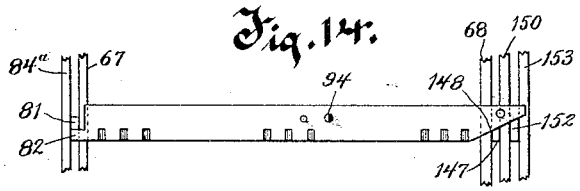
Figure 15:
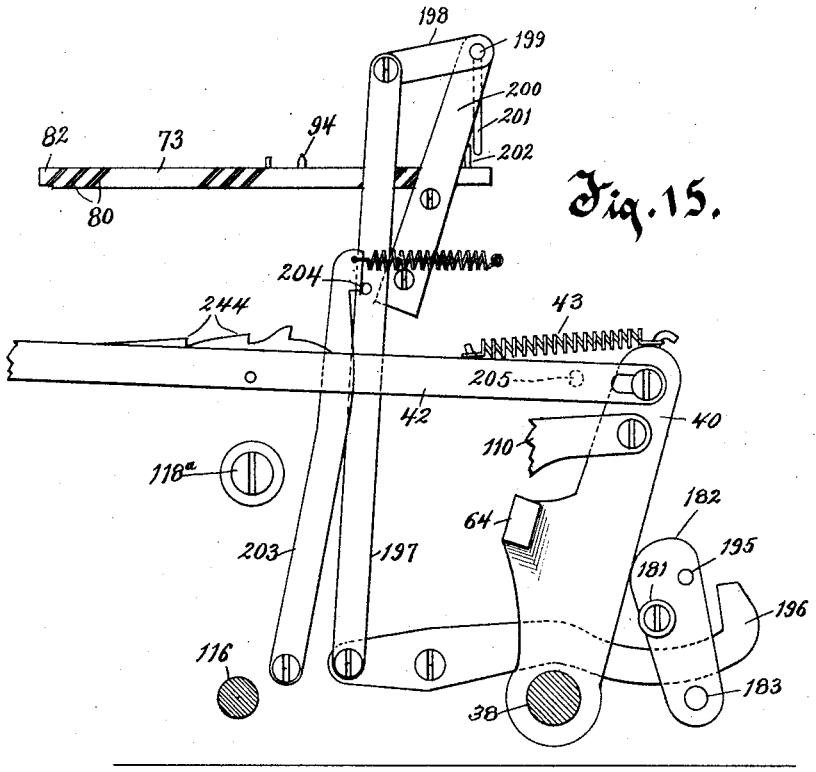
Figure 16:
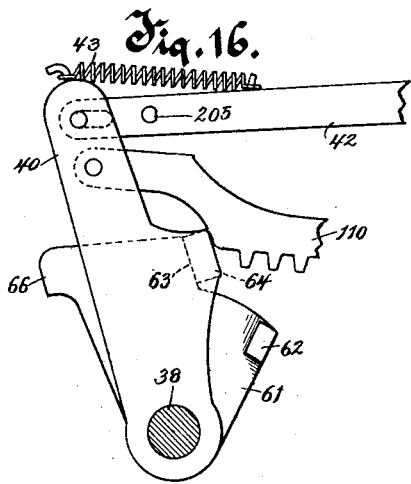
Figure 17:
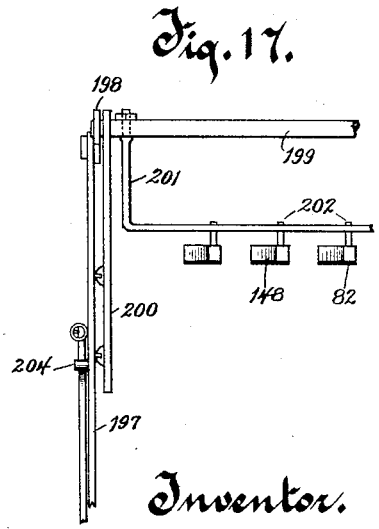
Figure 27:
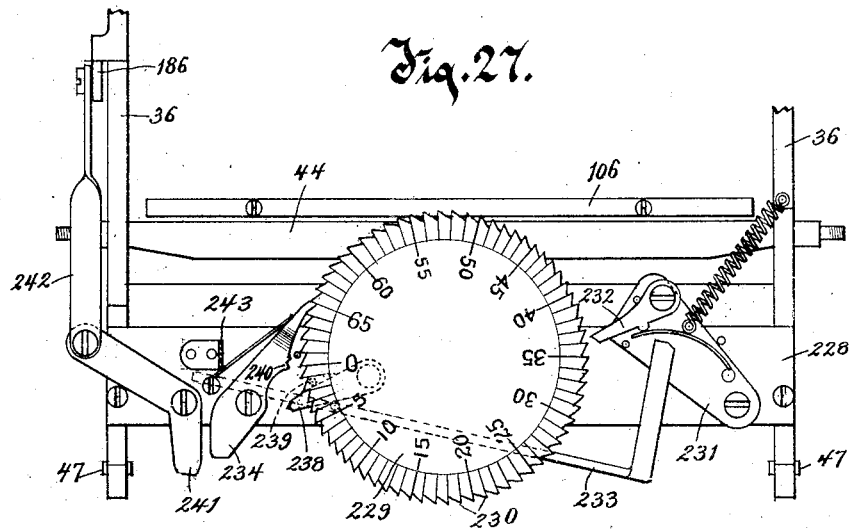
Figure 28:
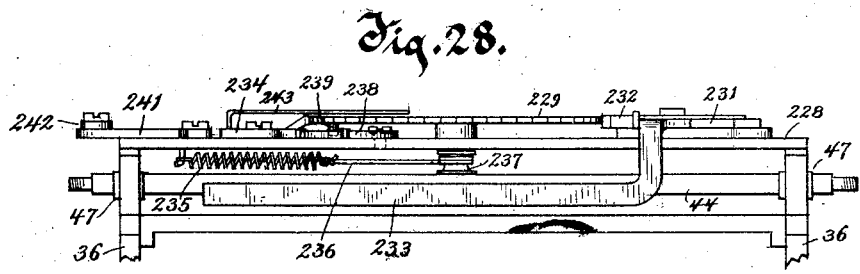
Figure 29:
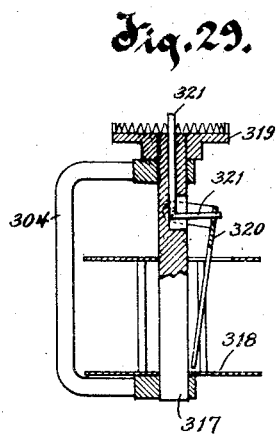

Referring to the accompanying drawings, forming a part hereof, and in which like characters of reference indicate the same parts throughout the several views, Figure 1 is a side elevation of a calculating-machine constructed in accordance with my invention, the casing being sectioned to expose the inner working parts to view. Fig. 2 is a similar view of the other side thereof, the casing being removed. Fig. 3 is a rear elevation of such machine without the casing. Fig. 4 is a plan view of the same machine with the carriage removed and portions of the casing and shield broken away. Fig. 5 is a longitudinal vertical section of the machine. Fig. 6 is a detail view of some of the principal operating members shown removed from the remainder of the machine, but in their relative positions, and showing parts seen in a section through the hammer-frame. Fig. 7 is a detail sectional view of one of the actuating-bars with its tripframe in position. Fig. 8 is a transverse section thereof on the line 8 8 of Fig. 7. Fig. 9 is a rear elevation of the line of calculatingwheels and some of the members coöperating therewith, the actuating-bars and other parts being sectioned. Fig. 10 is a detail view of one of the calculating-wheels and some of the members coöperating therewith, showing the detent side of said calculating-wheel. Fig. 11 is a plan view of one of the trip-frames. Fig. 12 is a plan view of the shifting-bar. Fig. 13 is a rear elevation thereof. Fig. 14 is a plan view of one of the slidable bars with some of its adjuncts. Fig. 15 is a detail view of the crank-arm by which the resetting operation is accomplished and some of the parts coöperating therewith. Fig. 16 is a detail view of such crank-arm with its engaging segment-plate as seen from the other side. Fig. 17 is a detail view of the upper parts of Fig. 15 looking at the rear ends of the slidable bars. Fig. 18 is a side elevation of the lifting-bar-operating mechanism with parts sectioned on line 18 18 of Fig. 19. Fig. 19 is a plan view of the lifting-bar-operating mechanism and the knife-edge-bar-operating mechanism. Fig. 20 is a side elevation of the oscillating-plate-operating mechanism. Fig. 21 is a plan view thereof. Fig. 22 is a detail view of the shaft-shifting connection. Fig. 23 is a front elevation of the key-frame with the front plate broken away to show the stops for the slidable bars and the release-bar. Fig. 24 is a detail plan of the release-bar. Fig. 25 is a rear elevation of the key-frame with the back plate broken away to show the blank stop-levers and their connections. Fig. 26 is a rear elevation of the key-frame with a plate broken away to show the zero stop-levers. Fig. 27 is a plan view of the index-wheel and its operating parts. Fig. 28 is a front elevation thereof, and Fig. 29 is a detail section of one of the ribbon-reels and coacting parts.

In the figures, 35 represents the casing of the machine, which may be of any desired construction adapted to suitably inclose the operative parts; but I prefer to employ the construction shown in the drawings, the particular features of which will be referred to herein as the description of the parts requires. The frame contained within the casing for supporting the operative parts of the machine may be of any desirable construction; but I prefer to employ the frame shown in the drawings, which consists in substantially duplicate side pieces 36 with cross-bars 37 secured to the front and back legs thereof to form supports for the frame. A crank-shaft 38 is journaled across the frame in bearings located on the rear under part of the side pieces 36, and rigidly mounted on its ends outside of said side pieces are upwardly-extending crank-arms 39 and 40. On opposite sides of the machine pitmen 41 and 42 are pivoted at their ends in the upper ends of crank-arms 39 and 40, respectively, and such pivot connections are produced by headed projections on the crank-arms sliding in longitudinal grooves of the pitmen in order that there may be a slight play or free motion between these parts. Coiled springs 43 also connect the pitmen and the crank-arms to give the headed projections of the crank-arms the tendency to move to the forward ends of the slots of the pitmen. That the headed projections are not shown in such position in the drawings is due to an overpowering opposite tendency which will be referred to later. The front ends of the pitmen 41 and 42 are connected by a cross-head or return-bar 44, which extends across the front of the machine and is slidable in horizontal elongated slots 45 in the side pieces 36. The connections between the return-bar 44 and the pitmen 41 and 42 are pivotal, and the ends of said return-bar are held in position in the slots 45 by vertical pins 46 therethrough bearing on the outside of the side pieces 36. The return-bar 44 is limited in its inner movement by contact with the inner ends of slots 45 and in its outer movement by striking buffer-cushions 47 of rubber or other suitable material seated in the outer ends of slots 45.

As best seen in Figs. 3 and 5, the crank-shaft 38 is provided with a number of upstanding serrated crank-lugs 48, and a bracket-rod 49, extending across the rear of the machine between projections of the side pieces 36, is provided with corresponding notched lugs 50. A number of strong coiled springs 51 are stretched between the lugs 48 and 50 and give the crank-shaft 38 a tendency to swing the crank-arms 39 and 40 rearwardly and seat the headed projections thereof in the rear end of the slots of the pitmen 41 and 42, notwithstanding the opposite tendency of springs 43.

A shaft 52 is journaled across the machine in boxes at the rear ends of the side pieces 36 and is provided with cranks 53 and 54, the former being connected by a link 55 with crank 39 and the latter being pivoted to the piston-rod of a dash-pot 56, which is pivotally mounted on a pin 57 between one side piece 36 and a lug on the rear cross-bar 37. By this means the rearward motion of the return-bar 44 is cushioned against a too-violent retraction by springs 51.

An operating-lever 58 has a sleeve 59 on its end, which loosely fits over the end of crank-shaft 38, projecting beyond the crank-arm 40. This sleeve 59 is confined in its position by a large-headed screw 60, threaded in the end of shaft 38, and by passing through an opening in the casing 35 serves to locate the operating-lever 58 a sufficient distance from the machine proper to safely clear the casing 35 during its operation, as clearly seen in Fig. 4.

On the inner end of sleeve 59 and preferably formed integral therewith is an upwardly-extending segment-plate 61, which has an inwardly-extending lug 62 at its forward edge capable of engaging the edge of crank-arm 40 under particular circumstances to be mentioned later. (See Fig. 16.) The upper part of the segment-plate 61 has a shoulder 63, normally engaging an outwardly-projecting lug 64 on the offset of crank 40 and held in such engagement by a coiled spring 65, connecting lug 64 with a rearward projection 66 of the segment-plate 61. By this means a forward movement of the operating-lever 58 will impart motion to the crank-shaft 38 and mechanism connected therewith through the lug connection 64; but a rearward movement of said operating-lever will cause the shoulder 63 to recede from lug 64, the crank 40 being prevented from following by reason of the engagement of the return-bar 44 with the inner end of slots 45.

Having now described the means for imparting a horizontal lateral reciprocation to the return-bar 44 in the grooves 45, the keyboard-controlling devices to be operated by such reciprocation will now be set forth.

A rectangular boxing or key-frame having a front wall 67, a back wall 68, side walls 69 and 70, top plate 71, and bottom plate 72 is secured upon the side pieces 36 of the main frame in a horizontal position. The top plate 71 is lowered in the walls of the frame, so that said walls project slightly above said top plate. A number of sliding bars 73 are mounted to slide upon the top plate 71 and are held in position by a pair of guide-rods 74, extending lengthwise over the key-frame and secured to upwardly-extending lugs on the side walls 69 and 70. The slidable bars are confined within notches in the under edges of the guide-rods 74 and are provided with undercuts at their two ends to enable them to slide without engaging their ends with the front and back walls 67 and 68 of the key-frame during their operative movements, but to engage the shoulders formed by these undercuts with said front and back walls at the limits of said operative movements, as shown in Fig. 5. Each slidable bar 73 has a spring 75 connecting it with the front guide-rod 74, so that they all have a tendency to normally rest at the forward limit of their movement.

A number of rows of keys 76, preferably nine in a row, as shown, have the lower vertical part of their stems passed through perforations in the top and bottom plates of the key-frame, such perforations of each row being grouped in sets of three, as shown. The key-stems between the top and bottom plates of the key-frame are surrounded by coiled springs 77, which give said keys an upward tendency by bearing against cross-pins 78 through the stems, which upward tendency is limited by the engagement of said cross-pin 78 with the under side of the top plate 71. In these lower vertical portions of the key-stems are also located laterally-projecting pins 79, and directly therebeneath in the side of the slidable bar 73, which brushes against said key-stems, are inclined cam-slots 80, so that when any key is depressed against the tendency of its springs 77 the pin 79 thereof enters the inclined slot 80 beneath it and in its downward movement forces the slidable bar 73 to the rear against the action of its spring 75. This movement of the slidable bar 73 carries the other cam-slots 80 thereof out of the path of the pins 79 on the other keys of that row, so that when one of the keys of a row is depressed no other key thereof can be operated.

A number of upwardly-extending spring-pressed stops 81 are pivoted to the face of the front wall 67 of the key-frame in position to stand in the path of the slidable bars 73. Normally they stand centrally in front of such slidable bars 73 in cut-away portions of said slidable bars and are pressed by their springs against the end projections 82 of the slidable bars formed by such cut-away portions; but when the slidable bars are forced to the rear by pressing the keys 76 the end projections 82 slide from the stops 81, and said stops spring in front of the end projections, and so prevent the slidable bars from returning.

A release-bar 83 slides longitudinally in a groove in the face of the front plate 67 and has forwardly-projecting lugs 84, extending between the stops 81. Such release-bar is spring-pressed to normally hold it in its inner position, as shown in Fig. 23, and when so located the lugs 84 thereof form abutments to limit the swing of the stops 81 when they are operated as above described, so that the upper ends of said stops stand in the proper positions to be engaged by the end projections 82 of the slidable bars 73. A front plate 84ⁿ stands in front of the stops 81 and the release-bar 83.

A double bell-crank or T-shaped lever 85 is pivoted at 86 to the side wall 69 of the key-frame and has on the end of its stem a beveled or inclined projection 87, fitting in a correspondingly beveled or inclined rearwardly-extending lug 88 on the projecting end of the release-bar 83. A roller 89 is mounted on the end of the upper arm of the lever 85 and is engaged by a thumb-lever 90, pivoted to the side wall 69, when said thumb-lever is swung forwardly against the action of its spring. Such engagement causes the bell-crank lever 85 to press downwardly on the cam connection with the release-bar 83 and cause said bar to be moved outwardly by the coaction of the inclined surfaces of projection 87 and lug 88, and so release all slidable bars 73 then held by the stops 81. The lower arm of bell-crank lever 85 is spring-actuated and is provided on its end with a roller 91, which stands in the path of a pivoted cam 92, carried by pitman 41, so as to be engaged by said cam and to operate the release-bar 83 during the backward movement of said pitman. During the forward movement of the pitman said cam on meeting the roller 91 swings to lift its tail end from its limiting-pin, and so passes the roller 91 without operating the release-bar.

A U-shaped locking-bar 93 has its ends pivoted to the front lugs on top of the side walls 69 and 70 and swings down into contact with the upper surface of the slidable bars 73 to engage in front of or to the rear of knife-edge stop-pins 94 on said slidable bars, according to whether said bars are in their back or front positions. A spring 95 lifts the locking-bar normally from the path of the stop-pins 94, and a link 96, having a sliding connection with the thumb-lever 90 at one end, is pivoted to the locking-bar, and by means thereof the said locking-bar may be depressed by forcing thumb-lever 90 backward until the link 96 has passed the line between its pivot and that of lever 90, when said lever strikes a stop-lug 97 and will remain in this position until forced forward into its normal position. By this means a number of keys may be depressed and then the thumb-lever thrown backward to lock the slidable bars operated by those keys, and said bars will remain in their operated positions unaffected by the release-bar during any number of motions of the operating-handle until the thumb-lever is again thrown forward. The keys arranged in groups of three, as before mentioned, are regularly spaced at their upper ends by bending the stems of the outside keys of each group, as shown in the drawings, and these upper ends of the keys are provided with figured buttons, as usual, and are arranged in a single plane inclined forwardly. A shield 98 is mounted over the key-frame and has perforations through which the key-stems pass, and this shield serves to fill in an opening therefor in the casing 35, as seen in Figs. 1 and 4. As best seen in Fig. 5, each row of keys has located beneath it a longitudinal actuating-bar 99, the rear ends of said actuating-bars having a sliding bearing on a round rod 100, extending across the rear end of the machine from one side piece thereof to the other, and said rear ends of the actuating-bars 99 being confined in cross-grooves in the under side of a heavy rigid bridge-piece 101 just above rod 100 and also joining the side pieces of the frame. At their front ends said actuating-bars 99 are supported upon the rear edge of an oscillating plate 102, which is pivoted at its ends, at the forward edges thereof, to side pieces of the frame and is caused to oscillate from the inclined position shown in Fig. 5 to a horizontal position during the operation of the machine by means hereinafter described. Each actuating-bar 99 has depending from it just in advance of the rod 100 a hook 103, with a coiled spring 104 connecting it to a rod 105, extending across the machine nearer the front end thereof. The springs 104 give the actuating-bars 99 a forward tendency, pressing them against the return-bar 44, where they are confined beneath a bar 106, which is supported from the oscillating plate a short distance above the same, and which bar is provided with notches on its under side to receive said actuating-bars. The actuating-bars 99 are further prevented from lateral displacement by passing them through notches in the under side of a guide-rod 107, extending across the front of the frame. From the bridge-piece 101 to their forward ends the actuating-bars 99 are provided with central longitudinal grooves 108, and rigidly secured in these grooves about midway the length of the actuating-bars are stop-plates having upwardly-extending stop-lugs 109, adapted during the movement of the actuating-bars 99 to travel directly beneath the ends of the stems of keys 76 and to engage with said ends of the stems of whichever keys are depressed to stop further forward movement of such actuating-bars 99.

In the front part of the actuating-bars 99 are rack-bars 110, which are slidably seated within the grooves 108 and are given a tendency to slide rearwardly by coiled springs 111 connecting them with hooks on the front ends of said stop-plates. Each rack-bar 110 is held against accidental displacement and is limited in its longitudinal movement in the groove 108 by a depending lug 112, extending through a slot in the bottom of the groove 108 and having a pin therethrough bearing on the bottom of the actuating-bar 99, and also by a pin 113 extending across the forward end of groove 108, beneath which slides a reduced forward projection of the rack-bar 110.

Loosely mounted on the shaft 114 are a number of calculating-wheels 115, (see Fig. 5,) each provided with suitable index characters, preferably numerals from "1" to "9," inclusive, and rigidly secured to the side of each calculating-wheel 115 is a pinion $115^a$, normally meshing with the rack-bar 110 thereneath. By this means the longitudinal movement of the actuating-bars 99 is transmitted to the calculating-wheels as long as the forward ends of said actuating-bars are held up by the oscillating plate 102, so that the pinions $115^a$ mesh with the rack-bars 110; but when said oscillating plate is swung downward by means to be now described the rack-bars are free of the pinions, and movement of the actuating-bars does not affect the calculating-wheels.

Referring to Fig. 1, a shaft 116, capable of a sliding longitudinal movement by means to be described later, is journaled across the machine and carries at one end a segmental gear 117, meshing with a rack-arm 118, which is pivoted to the crank-arm 40 and which is held in mesh with said segmental gear 117 by means of a grooved guide-roller $118^a$, mounted on the side piece 36 of the machine-frame. The oscillation of the crank-shaft 38 is through this connection transmitted to the shaft 116.

A double segmental cam-frame 119 (see Figs. 20 and 21) is rigidly mounted on shaft 116 and preferably comprises a cast supporting and base portion with a sheet-metal traveling surface. The traveling surface of this double cam-frame, as shown in the drawings, is provided with straight end portions 120 at the same distance from the shaft 116, with an intermediate arc-shaped portion 121 concentric with the shaft 116 and inclined connecting cam portions 122 between the end portions 120 and the arc-shaped portion 121. Opposite side posts 123 stand up from the base portion of the cam-frame and have pivoted to their ends bridge-levers 124 and 125, the former having a spring 126 normally holding its rear end against the back cam 122 and the latter having a spring 127 normally holding its forward end against the front cam 122. The outer surface of each bridge-lever is formed of two arcs of radii approximately equal to the distance between the center of the shaft 116 and the end portions 120, so that when either end of said bridge-lever bears against an end portion 120 the arc at that end thereof will be approximately concentric with shaft 116.

An angular arm 128 is carried by a sleeve 129, which is loosely mounted on a shaft 130 and which also carries a slotted arm 131, having a sliding connection with the headed projection 132 on the end of an arm 133, rigidly connected with the oscillating plate 102. The angular arm 128 has on its free end a pair of oppositely-disposed rollers 134 and 135, capable of riding on the bridge-levers, one only at a time, the operative engagement with their bridge-levers being shifted from one to the other as the shaft 116 is moved longitudinally. Normally the shaft 116 is in such position that roller 134 operates on bridge-lever 124, and then the movements of the operating-lever produce a downward motion to the oscillating plate 102 at the start of the forward stroke of the operating-lever by reason of the roller 134 passing down the front cam-surface 122. Then near the end of said forward stroke said oscillating plate 102 is again raised by the roller traveling up the rear cam-surface 122 onto the end surface 120 by lifting bridge-lever 124 against its spring action. On the return stroke of the operating-lever the roller 134 rides on the curved outer surface of the bridge-lever 124 and when passing the pivot thereof swings said bridge-lever 124 against the action of its spring, so that its forward end engages the forward end portion 120, to which said roller passes. During this return stroke the distance between the shaft 116 and the roller 124 has remained approximately constant, and therefore no motion is given to the oscillating plate 102. When the shaft 116 is moved lengthwise out of its normal position, the double cam-frame 119, being moved therewith, brings the other roller, 135, into operative engagement with bridge-lever 125, and as said bridge-lever is held by its spring in the opposite position to that of bridge-lever 124 it will produce an operation of the oscillating plate 102 just the reverse of that described for the other bridge-lever—that is, on the forward stroke of the operating-lever said oscillating plate will remain unmoved, the roller 135 being traveling over the bridge-lever 125; but on the return stroke said oscillating plate is first lowered and held so during the travel of the roller 135 over the arc-surface 121 and then raised to its normal position. It is obvious on referring to Figs. 5 and 6 that the movements of the oscillating plate 102 serve to raise and lower the ends of actuating-bars 99 to bring their rack-bars 110 into and out of mesh with the pinions 115$^a$, so that the longitudinal movements of the said actuating-bars are only transmitted to the calculating-wheels 115 when said oscillating plate is raised. To prevent accidental turning of the calculating-wheels 115, a universal detent-bar 136 is pivoted to the outside of lugs 137 on side pieces of the frame just in front of the key-frame, and said detent-bar is provided with a series of forwardly-extending detents or pawls 138, adapted to engage with the teeth of the pinions 115$^a$. A coiled spring 139 connects a forwardly and upwardly extending arm 140 on the universal detent-bar 136 with a front part of the frame and gives said detent-bar a tendency to rock forward and seat its pawls between the teeth of the pinions 115$^a$.

A lever 141 is pivoted to the forward part of the frame and has a depending lug bearing on the oscillating plate 102 and a rearwardly-extending arm having a bearing on the under side of arm 140, so that when the oscillating plate 102 is in its upper position and the rack-bars 110 are in engagement with the pinions 115$^a$ the universal detent-bar 136 is pressed upwardly by the lever 141 until the pawls thereof clear the pinions 115$^a$; but when said oscillating plate 102 is lowered to release the rack-bars 110 from the pinions the lever 141 lowers also and permits spring 139 to draw the detent-bar 136 downward to engage all of the pinions 115$^a$, and so accidental turning of the calculating-wheels is prevented.

A resetting-bar 142 is pivoted at its ends to the inner sides of the lugs 137 and has a series of forwardly-projecting arms 143, adapted to engage cam-lugs 144 on the sides of calculating-wheels 115 opposite to the pinions 115$^a$ thereof. These lugs are inclined one way to allow of the turning in the direction they are moved by the normal operation of the actuating-bars 99 without hindrance by the arms 143, but adapted to be engaged by said arms when turned in the opposite direction by means hereinafter explained, and when so engaged the calculating-wheels are set at zero. At one end the resetting-bar 142 is provided with a forwardly-extending lug 145, upon which a lift-spring 146 bears to give said resetting-bar a downward spring tendency.

As far as described it will be understood that one of the keys 76 being depressed the end of its stem projects downward into the path of the stop-lugs 109 of the actuating-bar therebeneath, and when the operating-lever is moved forward it turns shaft 116 to cause the cam mechanism carried thereby to first lower the oscillating plate 102 and release the rack-bar 110 from engagement with the pinion 115$^a$. This takes place during the travel of the headed projection of crank-arms 39 and 40 in the slots of the pitmen 41 and 42. Then the cross-head 44 moves forward and the actuating-bar follows it, being moved by its spring 104 until one end of the lugs 109 engages the end of the projecting stem and stops the forward movement of the actuating-bar. At the end of the forward stroke of the operating-lever and during the return stroke the rack-bar 110 is again held in mesh with its pinion, and when the cross-head or return-bar 44 engages the end of the actuating-bar said actuating-bar is returned to its original position, meanwhile turning the calculating-wheel to an extent corresponding with the length of its movement from the position in which it was stopped by the key-stem to its normal position. The location of the stop-lugs 109 is such that one lug can be engaged by the stems of one group only, and the distance of movement of the actuating-bar between the positions of stoppage by the successive keys is the same throughout, so that the degree of rotation imparted to the calculating-wheel is regular with the several keys. (See Figs. 25 and 26.)

On the rear face of the back wall 68 of the key-frame are pivoted a number of stop-levers 147, which because of their function during the operation will hereinafter be termed "zero stop-levers." These zero stop-levers 147 are spring-pressed in a direction to cause their upper reduced ends to bear with their beveled edges upon the inclined rear ends of the slidable bars 73, which form cams 148 for swinging said zero stop-levers on their pivots when the slidable bars 73 are moved longitudinally. At their lower ends the zero stop-levers 147 stand close to the actuating-bars 99 and may engage cam-lugs 149 on the sides of said actuating-bars 99 to prevent said actuating-bars from moving forward farther than this point of engagement. Any slidable bar 73 which has been operated by one of its keys in moving backward presses its zero-lever 147 away from the cam-lug 149, so that the actuating-bar 99 is free to pass.

Behind the back wall 68 of the key-frame is a plate 150, having a longitudinal groove near its upper edge in which slide a series of blocks 151, having pivoted thereto a series of stop-levers 152, hereinafter termed "blank stop-levers," because of their functions during the operation of the machine. The blank stop-levers 152 are also pivoted to the plate 150 and have their upper reduced ends engaging their beveled edges against the cam-surface 148 of the slidable bars 73. The first two blank levers 152 are pivoted to a single block 151 and are spring-pressed toward the others, which are each pivoted to a separate block 151. By this arrangement the operation of either of the first two slidable bars 73 will by means of the cam end 148 thereof swing both the first and second blank stop-levers 152 by reason of their being connected by the first block 151, and an operation of any other slidable bar will, through the abutment of the several blocks 151, swing all of the blank stop-levers up to the one directly operated upon by the said slidable bar. The lower ends of the blank stop-levers 152 engage the cam-lugs 149 normally, and so prevent the movement of the actuating-bars 99. A back plate 153 is located behind the blank stop-levers 152.

The transfer mechanism by which each calculating-wheel 115 carries forward its tens on the next calculating-wheel will now be described with reference to Figs. 5 and 6 and 7 to 11. On a shaft 154, just beneath the oscillating plate 102, are loosely mounted a series of trip-frames 155, which are each preferably formed of a blank of sheet metal, with a flat portion having a downwardly-bent pivot-eye 156 on each side of one end and its other end terminating in a short downwardly-directed spur or tooth 157 on one side and an upwardly-bent angular stop-arm 158 on the other side. These trip-frames have their pivot-eyes loosely mounted on shaft 154 and normally stand with the angle portion of their stop-arms 158 in the path of the pins 159, projecting from the sides of the rack-bars 110 and through openings 160 in the side walls of grooves 108. This engagement with pins 159 normally holds the rack-bars 110 in their forward position against the action of their springs 111. The trip-frames 155 are supported in their normal position just described by trip-levers 161, which are pivoted at their lower ends between spacing-sleeves 162 to a shaft 163 and have engaging teeth 164 near their upper ends, on which the spurs 157 of the trip-frames 155 are pressed by coiled springs 165, connecting them with a rod 166. The upper end of each trip-lever 161 extends in close proximity to the periphery of the calculating-wheel 115 which is adjacent to the one whose rack is held forward by the trip-frame supported by such trip-lever and is adapted to be engaged by a lug 167 on said periphery and forced rearward thereby against the action of its spring 168, connecting it with rod 166. In so swinging backward the trip-lever 161 releases the spur 157 of the trip-frame from its engaging tooth 164 and permits the spring 165 thereof to lower said trip-frame until the spur 157 engages a shoulder 169 on the trip-lever. This downward movement of the trip-frame 155 is sufficient to remove the angular portion of the stop-arm 158 from the path of pin 159, so the rack-bar 110 is drawn to the rear by its spring and in doing so turns its calculating-wheel 115 one figure. It is obvious that this operation will be repeated with each complete rotation of any calculating-wheel 115, and the lug 167 is so positioned on the periphery of the calculating-wheel that its operation of the trip-lever takes place simultaneously with the appearance of the zero-mark thereof on the reading-line. In order to restore the trip-frames 155 to their original position after the operation just described, a lifting-bar 170 is pivoted on the shaft 154 and has upwardly-extending lugs 171 to engage the under side of the flat portion of the trip-frames 155. An arm 172 extends rearwardly from the lifting-bar 170 and carries on its end a roller 173, (see Figs. 18 and 19,) engaging a spring-actuated pivoted cam-tongue 174, mounted upon a segment 175, which is carried by the sliding shaft 116. During the forward stroke of the operating-lever 58 the segment 175 rocks forward, and the roller 173 rides up the incline of cam-tongue 174, meanwhile lifting all fallen trip-frames 155 by the lifting-bar 170, until near the end of said stroke, when the roller drops from the pivot end of the cam-tongue to the surface of the segment and returns to its original position, bearing on said segment-surface and lifting the cam-tongue against its spring action during the return stroke of the operating-lever. Near the segment 175 is another segment 176, also mounted on the sliding shaft 116 and carrying a pivoted spring-actuated cam-tongue 177, on which rides a roller 178, carried on the end of an arm 179, extending from a knife-edge bar 180, which is pivoted across the frame. The roller 178, operating as just described of roller 173, causes the knife-edge bar 180 to swing and engage the downwardly-extending lugs 112 of those rack-bars which have been released by the trip-frames 155 and press them forward into their normal position. The segment 176 is set slightly in advance of segment 175, so that the return of the rack-bars 110, as above described, will just precede the return of each trip-frame 155, and the latter when locked in position by the spur riding up the inclined lower edge of the engaging tooth 164 until again snapping into its seat on said engaging tooth will again engage the pin 159 and retain the rack-bar in its normal position. It will be noted that the return movement of the rack-bars just mentioned is accomplished during the forward stroke of the operating-lever while the actuating-bars are lowered and said rack-bars do not mesh with pinions 115$^a$. It will be further noted that the width of the tread of the segments 175 and 176 is such that the rollers 173 and 178 travel thereon when the shaft 116 is moved longitudinally and the cam-tongues are out of the path of said rollers.

As seen in Fig. 1, a backward movement of the operating-lever 58 after it has reached its normal position carries segment-plate 61 away from lug 64 against the action of spring 65 and causes the rear edge of said segment-plate 61 to bear upon a roller 181, carried by an arm 182, which is rigidly mounted on a shaft 183, and to move said arm 182 backward, turning shaft 183 therewith. At the other end of said shaft, as seen in Fig. 2, is an arm 184, having pivoted to its end a link 185, which is also pivoted to a lever 186, and in turn this lever 186 is pivoted to the frame at 187 and is retracted by the spring 188. A link 189 connects lever 186 with one arm of a bell-crank lever 190, pivoted to an extension of the frame and having its other arm rounded, as shown in Fig. 22, and located within a peripheral groove in the shaft 116, so that motion imparted to lever 186 causes the bell-crank lever 190 to move the shaft 116 longitudinally in its bearings, and this shaft is provided with an enlarged end 191 to limit said movement.

A spring-pressed catch-lever 191 is pivoted to the frame and has on one end a shoulder 192, adapted to engage with a lug 193 on lever 186 when said lever is moved out of its normal position. At its other end catch-lever 191 has a pivotal connection with the slotted end of a link 194, which is also pivoted to the stem end of the double bell-crank lever 85, so that after the lever 186 has been thrown forward by a rearward motion of the operating-handle and engaged there by the catch-lever 191 at the next forward operation of the operating-handle the bell-crank lever 190 on being swung by the cam 92 lifts the front end of catch-lever 191 and releases lever 186, so that its spring 188 returns it to its normal position, restoring the shaft 116 to its normal position.

As seen in Figs. 3 and 15, the arm 182 is provided with an inwardly-extending lug 195, with which a catch-lever 196 is adapted to engage on the rearward movement of arm 182 if said catch-lever is raised. The catch-lever 196 is pivoted near its forward end to the frame and is connected by a pivoted link 197 with a crank-arm 198, carried by a shaft 199, which is mounted in bracket-arms 200, secured to the sides of the frame, and has a depending bail-rod 201. Upwardly-extending lugs 202 are carried at the rear ends of the slidable bars 73, and when any of said bars 73 are forced rearwardly the lugs 202 thereof engage the bail-rod 201 and swing it backward, thereby raising the hooked rear end of catch-lever 196, so that it stands in position to engage lug 195 and prevent the backward operation of arm 182. As long as one of the slidable bars 73 is in its rearmost position the hook of catch-lever 196 is held raised, and in order that it shall not lower between successive operations of the machine a spring-actuated hooked detent 203 is pivoted to the frame and is adapted to engage a pin 204 on the link 197 when said link is lowered and prevent the hooked end of catch-lever 196 from dropping by its own weight. On the inner side of pitman 42, near the rear end thereof, is a lug 205, which engages the detent 203 during the forward movement of the operating-lever, and so releases the pin 204 and permits the hooked end of lever 196 to drop if there is no slidable bar in its rear position to support it from the bail-rod 201. Thus the rearward or setting operation of the operating-lever is prevented, except after a stroke of the said operating-lever for which no key was depressed.

Pivoted at their lower ends on a shaft 206 are a number of trip-levers 207, one for each calculating-wheel 115 except the first three. These trip-levers 207 have notches at their upper ends forming lugs or shoulders adapted to be engaged by the lugs 167 on the periphery of the calculating-wheels 115 on the first movement of said calculating-wheels in turning from the zero-mark. The backward movement thus imparted to the trip-levers 207 sends the rods 208, which are pivoted to their upper ends, backward, sliding in the shift-bar 209, by which they are supported. Normally the ends of rods 208 extend between the lower ends of the zero stop-levers 147; but this backward movement thereof carries them between the blank stop-levers 152 as well.

A bell-crank lever 210, as clearly seen in Figs. 12 and 13, is pivoted to the frame and has one arm pivoted to a link 211, which is also pivoted with a slot connection to lever 186. The other arm of said bell-crank lever 210 has a coiled spring 212 connecting it to the shift-bar 209 and has a depending side lug 213, which is adapted to engage the end of said shift-bar and return it to its normal position after being moved longitudinally during the swing of lever 186 through the spring connection 212. The longitudinal movement of the shift-bar 209 causes the ends of the rods 208 to press the zero stop-levers 147 and the blank stop-levers 152 out of the path of the cam-lugs 149, so that the actuating-bars thereof are free to follow the cross-head 44 until the cam-lugs 144 on the calculating-wheels 115 come into engagement with the arms 143 of the resetting-bar, in which position the said calculating-wheels show zero on the reading-line. As the return movement of the actuating-bars is made while they are lowered, the zero position of the calculating-wheels is not disturbed.

It will be seen from the foregoing that any calculating-wheel which has been moved at all during the main operation of the machine has its rod 208 in its rear operative position, and the first three calculating-wheels, instead of having the rods 208, are made to always operate during the resetting operation by three rearwardly-extending pins 214, carried by the shift-bar 209, which engage the zero stop-levers and blank stop-levers of the first three actuating-bars in the same manner as the ends of rods 208 when in operative position. To restore said rods 208 to their normal position after the resetting operation just described, a shaft 215 is journaled across the frame and has an upwardly-extending bail-rod 216, capable of swinging the trip-levers 207 forwardly. On the end of said shaft 215, as seen in Fig. 2, is a crank 217, pivoted to a link 218, having a slot connection with one arm of a bell-crank 219, which is pivoted on the frame, and has its other arm connected by a link 220 to the lever 186. When the lever 186 is swung forward and caught by the lever 191, the bell-crank lever 219 lifts the rear end of link 218, so that its rearwardly-extending projection stands in the path of a lug 221 on the inner side of crank-arm 39 to be engaged by said lug at the end of the forward stroke of the operating-lever and swing the bail-rod 216 forward. On a shaft 222 across the frame are a number of pawls 223, suitably separated by spacing-collars and having on their ends small rounded lugs or rollers 224, adapted to engage on either side of angular lugs 225 on the trip-levers 227 to hold said trip-levers in either their normal or tripped positions. Leaf-springs 226, mounted on the bar 227, extending across the frame, bear upwardly on the pawls 223.

Referring to Figs. 27 and 28, a plate 228 is secured across the front end of the frame of the machine and has pivoted therein an index-disk 229, having its periphery provided with regularly-arranged teeth 230, with index lines and numerals leading therefrom. A plate 231, pivoted to plate 228, is spring-retracted against a lug on plate 228 and carries at its free end a spring-pressed pawl 232 to engage with the teeth of index-disk 229. An angular depending arm 233 is carried by plate 228 and has its lower horizontal end in the path of the cross-head 44, so that at each forward operation of the operating-lever the arm 233 is pressed forward by the cross-head 44, causing the disk 229 to be turned one notch clockwise by the pawl 232. The disk 229 is held in its adjusted positions by a spring-pressed detent 234, pivoted on plate 228, and is given a spring tendency anticlockwise, or against the direction of its feed by pawl 232, by a coiled spring 235, secured beneath the plate 228 and having a cord 236 connected to its end and wound about a small drum 237, carried by the pivot-shaft of the disk 229. Beneath disk 229 is pivoted to the plate 228 a dog 238, confined in its movements by two lugs on the plate 228, and to the under side of said disk is a lug 239, which is adapted to engage the dog 238 during the rotation of the disk and is so positioned that said dog is engaged thereby and moved against the detent 234 when the disk is just completing a rotation or when the zero-mark thereon has nearly reached its starting-point. When the rotation is complete, the dog 238 is pressed by the lug 239 onto the shoulder 240 of the detent, forcing said detent against its spring action out of engagement with the teeth of the disk 229 to permit the spring 235 returning the disk to its original position. At the end of the rapid return of the disk the lug 239 strikes the dog 238 on the side opposite to that engaged before and knocks it out of the notched shoulder 240, releasing the detent 234 and starting the disk again at zero. The forwardly-extending end of detent 234 is adapted to be engaged by the free end of an angular lever 241, pivoted to the plate 228 and connected by a link 242 with the upper end of lever 186, so that the forward swing of lever 186 causes the angular lever 241 to press against the detent 234 and disengage its point from the teeth of disk 229 to permit said disk to return by its spring action to its starting position. An index-frame 243 has a stem portion secured to plate 228 and its open body portion bent over the index-disk 229, with its finger standing directly over the index-marks on the said disk to show at a glance the position of the index-wheel.

There have previously been mentioned herein several means for preventing a false or incomplete operation of parts of the machine, such as the slidable bars 73, to prevent more than one key in a line being pressed at a time and the catch-lever 196 to prevent the resetting operation until after a stroke of the operating-lever, during which no key was depressed; but besides these there is provided a means for preventing the return of the operating-lever when once started until it has completed its full forward stroke. This means comprises a plate 244, carried on the inner side of pitman 42, with its upper edge extending above said pitman and provided with a number of cam-engaging teeth and a spring-pressed catch-lever 245, pivoted to the side piece of the frame and having an outwardly-turned end adapted to ride on the plate 244 and slide over the teeth thereof successively during the forward stroke of the operating-lever 58. A lever 246 is pivoted to the side of the frame and has an angular lug 247 near its upper end riding in a cam-notch on the under side of lever 245, and said lever 246 is struck by inwardly-extending pins 248 on the pitman 42 at each end of its stroke to cause the lug 247 to slide in the cam-notch of the catch-lever 245 and raise or lower said catch-lever. The lever 246 is retained in the position in which it is placed by being struck by the pins 248 by a spring-pressed pivoted catch 249, having two notches in its upper edge engaging a lug 250 on the lever 246. By this means the catch-lever 245 is elevated out of range of the teeth on plate 244 by the engagement of the rear pin 248 with lever 246 at the end of the forward stroke of the operating-lever 58 and is retained in this position during the return stroke of the operating-lever by the lever 246 being held by the engagement of the lug 250 with the foremost notch in catch 249. At the end of the return stroke of the operating-lever the front pin 248 restores the catch-lever 245 to its original position.

Referring to Figs. 3, 5, and 6, it will be seen that the actuating-bars 99 carry near their rear ends rigidly-secured upwardly-extending posts 251, said posts converging, as seen in Fig. 3, to bring their upper ends close together where each is provided with a rearwardly-projecting type-rack 252, through which freely slide a series of vertical type 253, having upper and lower shoulders limiting their vertical movement in the rack. The faces of these type preferably contain the numerals from "0" to "9," as shown in plan in Fig. 4.

Midway of the bridge-piece 101, and preferably formed integral therewith, are side pieces 254 of a hammer-frame, between which is secured a shaft 255, having loosely mounted thereon a series of depending trip-levers 256 and a series of forwardly-extending hammers 257, the said trip-levers alternating in position with the said hammers. Each of the hammers 257 is guided between the depending teeth of a guide-bar 257ᵃ, extending across the hammer-frame, and has on its forward end an upturned striking-lug 258, which is normally covered by the rearwardly-extending stop-shoulder 259 on the post 251. At its pivoted rear end each hammer has a perforation 260, receiving a smaller pin 261 of the trip-lever 256 next thereto to form a connection between the two having a slight play or loose movement. Each trip-lever 256 has a coiled spring 262 connecting it to a cross-rod 263, extending across the front of the hammer-frame, and a swinging bar 264, pivoted by end arms to the sides of the hammer-frame, normally holds the trip-levers rearward against the action of their springs 262. One of the end arms of swinging bar 264 is continued downwardly into a bent lever 265, which is pivoted at its lower end to a link 266, being in turn pivoted to one side of an arm 267 on crank-shaft 38, so that the turning of said crank-shaft causes the bar 264 to swing. A trigger-plate 268 is pivoted by perforated ears to the side pieces of the hammer-frame and has a depending lug 269 on its under side, which is pivoted to the upper end of a link 270, which is lifted by a spring 271, and whose other end has a slot connection with the arm 267 on the side opposite the link 266. By this means the forward movement of the actuating-bars 99, previously described, moves the respective type-racks 252 forward to the same degree, bringing the type above the line of hammer-striking lugs 258 corresponding to the keys depressed. As the link 270 has a slot connection with arm 267, it does not operate the trigger-plate 268 as soon as swinging bar 264 is operated, and the result is that said swinging bar 264 nearly completes its forward movement, leaving trip-levers 256 engaged by the edge of the trigger-plate 268, when the connection between the link 27 and arm 267 reaches the end of the slot and said trigger-plate is swung down, releasing the trip-levers and permitting their springs 262 to forcibly retract them. Meanwhile owing to their connections with the trip-levers the hammers 257 are swung upwardly with force, and those posts 251, which have not moved from their normal position, receive the blow of their hammers on the stop-shoulders 259; but those which have moved forward receive the blow on the lower ends of their type, which stand along the printing-line, and said type are driven upwardly for printing, as hereinafter described. The play or free motion allowed in the connection between the hammers 257 and the trip-levers 256 is to permit the hammers to move slightly beyond the limit of the trip-levers to give the type a full blow and then drop below the line thereof, so as not to interfere with the return of the type-racks to their normal position. On the return stroke the swinging bar 264 moves the trip-levers 256 outward to their normal position, and the trigger-blade 268 is sprung by its spring 271 into its normal position after the trip-levers have passed.

At the rear end of the machine are secured upright brackets 272, supporting a horizontal rectangular carriage-guide frame 273, having opposed front and back guideways 274 to receive the sliding flanges 275 of the carriage-frame 276. In the end parts of the carriage-frame are inclined passage-ways 277, in which slide a shaft 278, carrying a platen 279 and having turning-knobs 280 on its ends. At each end of the carriage-frame is a triangular plate 281, which is pivoted by a headed lug on one of its corners to the hooked end of a link 282, which is pivoted to a projection at the end of passage-way 277. The shaft 278 is journaled in another corner of each plate 281, and a rod 283 connects the third corners thereof, said third corners being also provided with lifting-handles 284. At its middle portion the rod 283 is provided with a tearing-plate 285, which extends over the platen 279, and to either side thereof is a paper-guide 286, which is slidable on the rod 283 and is held in position by a spring-pressed V-shaped lug sliding in a similarly-shaped groove in said rod 283. The shaft-carrying corners of the plates 281 have rearwardly-extending arms, in which is journaled a shaft 287, carrying a spring-pressed feed-guide 288. By this means the surface of the paper on the platen 278 which is in position to receive the next imprint from the type 253 may be turned to the front to be in plain view, resting against the graduated scale 288ᵃ on the frame 273 by sliding the shaft of said platen up the passage-ways 277 as the result of lifting up the handles 284, and said platen may be returned to its normal position by pulling down on said handles.

The carriage-frame 276 is free to slide in the guideways 274 when the platen is in its upper position for showing the writing-surface of the paper, as just described, but is locked against movement when the platen is in its normal position by a lever 289, with its free end in position to be depressed by the shaft of the platen when in its normal position, such lever being carried on a spring-pressed rod 290, journaled along the rear edge of the carriage-frame 276 and having depending lugs 291 adapted to be forced against the shoulder of the rear guideway 274 against the spring action of the rod 290 when the lever 289 is pressed down by the platen.

The shaft 278 is provided with a gear-wheel 292, which meshes with a side gear 292ᵃ, meshing in turn with a pinion 293, carried on the end of a toothed cylinder 294, which is journaled within the carriage-frame 276 lengthwise thereof. A shaft 295 is journaled across the carriage-guide frame 273 and carries an intermediate pinion 296, meshing with the teeth of the toothed cylinder 294, and an end pinion 297, meshing with a gear-wheel 298, mounted on a bracket 272. A crank-arm 299 is loosely mounted on the same pivot as gear-wheel 298 and carries a gravity-pawl 300, engaging the teeth of said gear-wheel. At its lower end the crank-arm 299 is connected by a link 301 to the middle portion of a lever 302, which has a long slot connection at its lower end with a stud on crank-arm 39, and at its upper end it is pivoted to a lever 303. The lever 303 is pivoted to a ribbon-reel frame 304, secured to the bracket 272, and has a lug 305 adapted to be engaged by a pair of notches in the edge of a spring-pressed adjustment-arm 306, pivoted to the frame. An adjustment-handle 307 is pivoted to the end of lever 303 and is held by a strap 308 in an upright position, so as to be manipulated by the operator. When said adjustment-handle 307 is in its upper position, as shown, the lever 303 is held by the upper notch of arm 306, and the lug-pivot is in the lower part of the slot of lever 302, and therefore farther from the fulcrum of said lever than when the parts are in their lower position, and consequently the motion imparted to the crank-arm 299 is not so great and the amount of feed transmitted therefrom to the platen 279 by the train of gears, including the gear-wheel 298, pinion 297, tooth-cylinder 294, pinion 293, and gears 292ᵃ 292, is less than when lever 303 is depressed and the pivot is in the upper part of the slot of lever 302.

A shaft 309 is journaled across the rear of the machine and carries at its end a ratchet-wheel 310, which is engaged by a gravity-detent 311, pivoted on the bracket 272, and by a gravity-pawl 312, pivoted on an arm 313, which is loosely mounted on shaft 309 and is connected at its end to the crank-arm 39 by a link 314. By this means the oscillating motion of the crank-shaft 38 imparts a step-by-step rotary motion to the shaft 309. The shaft 309 is capable of slight longitudinal movement, which is permitted without disengaging detent 311 from ratchet-wheel 310 by reason of the angular bent end of said detent. The shaft 309 is held in either limit of its longitudinal motion by a lever 315, pivoted on an inward projection of the bracket 272 and has its upper reduced and yoked end embracing the shaft, with the headed extremities of the arms thereof bearing against the shoulders of an annular groove in said shaft 309. The lower end of lever 315 is confined between stop-pins and is provided with an oppositely-beveled cam edge, against which bears the roller end of a spring-pressed bell-crank lever 316, which is also pivoted on the projection of the bracket 272.

Each of the U-shaped ribbon-reel frames 304, which are connected to the brackets 272, has a shaft 317 journaled across its arms, as clearly shown in Fig. 29, and a ribbon-reel 318 is rigidly mounted on said shaft between the arms of the frame, while a crown-wheel 319 is rigidly mounted on said shaft outside of the arms of the frame. A gravity-lever 320 has its side ears standing up at approximately right angles to the main portion thereof and pivoted to opposite sides of the shaft 317, with its free end passing through an opening in one of the end disks of the reel and having a movement between the cross-bars of the reel. A pin 321 slides within a central perforation in the end of the shaft 317 and has its inner end bent outwardly, sliding in a slot in the side of shaft 317 and entering a perforation in the end of lever 320, so that the swing of gravity-lever 320 when the reel is empty will slide the pin 321 outwardly.

On the shaft 309 are fixed two pinions 322 at such positions that one or the other thereof will mesh with its crown-wheel 39 in each position of shaft 309. Oblique spur-wheels 323 are fixed on shaft 309 in such positions that each stands in front of a pin 321 of a reel when the pinion of said reel is out of mesh with the crown-wheel thereof. The teeth of such spur-wheels 323 are at such a slant that when the pin 321 is moved outward by the emptying of the reel, as just described, it stands between the teeth of said spur-wheel, causing them to act as cams to force the shaft endwise and engage the pinion of that reel and disengage the other pinion, so that the direction of feed of the inking-ribbon 324, wound on said reels, is changed from one reel to the other. Springs 325 are mounted on the brackets 272 to bear against the ends of the reels 317 to retard their motion, and guides are provided for the ribbon 324, consisting of loops 326, secured in upright standards 327, formed integral with the side pieces of the hammer-frame.

Though the operation of many of the parts of the machine has already been given in order that a better understanding of such parts and their relation to others may be had at the time the parts were described, a more general statement of the operation will now be given.

The machine having all parts in their normal positions, as shown in the drawings, and paper being in position on the platen 297 in the usual manner, the operator presses the keys 76 in the rows corresponding to the digits of the first number desired to be recorded and added to the others. For zero the row of keys corresponding to the column in which it occurs is left untouched. As each key is depressed it moves its slidable bar 73 to the rear, thereby locking all other keys in that row against accidental depression and swinging its zero stop-lever 147 and its blank stop-lever 152 by the rear cam end 148 thereof, so that they are removed from the path of the cam-lug 149 on actuating-bar 99 therebeneath. The slidable bar 73 in its rearward movement releases its stop 81, which springs in front thereof and prevents its return, thus locking the key in its depressed position, with the end of its stem in the path of one of the stop-lugs 109 of the actuating-bar 99 therebeneath, and also locking the zero stop-lever and the blank stop-lever in their new position. Now a forward movement of the operating-lever 58 carries the cross-head 44 forward, permitting all actuating-bars 99 which are released by their blank and zero stop-levers to follow until one of their stop-lugs 109 engages the stem of the depressed key, when it comes to rest. Such rows of the keys, which have not been operated have their actuating-bars checked from any forward movement by their blank stop-levers 152 engaging their cam-lugs 149 unless they are lower in order (taken from right to left on the keyboard) than a row which has been operated, in which event their blank stop-levers 152 have been moved aside by the engagement of the blocks 151, and their actuating-bars are free to move forward until the lugs 149 engage the zero stop-levers 147. The first two blank stop-levers 152 are connected to a single block 151, as these represent the cent figures and are desired to both be swung, even if only the first row of keys should be depressed. During the forward stroke of the operating-lever the roller 134 rides down the front cam 122 over the arc-shaped portion 121 and up the other cam 122 of the double cam-frame 119, thereby causing the oscillating plate 102 to first drop to disengage the racks 110 from the pinions $115^a$ and remain in its lower position throughout the forward movement of the actuating-bars 99 and then rise to again engage said rack-bars with said pinions. While the rack-bars 110 are out of engagement with the pinions $115^a$, the detents 138 engage said pinions and prevent their turning. When the cross-bar 44 approaches the end of this forward movement, it engages the arm 233 and gives the index-disk a turn of one tooth, which is indicated by the point of the index-frame 243. On the return stroke of the operating-lever the cross-head 44 engages the ends of the actuating-bars 99 in their several positions of rest and forces them back to their normal position, and as the roller 134 now rides on the bridge-lever 124 without appreciable movement vertically the oscillating plate 102 holds the ends of the actuating-bars so that their rack-bars 110 remain in engagement with the pinions and turn same proportionately to the distance said rack-bars have to travel to reach their normal positions. The amount of rotation given to each calculating-wheel 115 by the action just described is sufficient to bring to view along the reading-line that numeral therof which corresponds to the numeral of the key depressed. During the return movement of the operating-lever the cam 92 swings the double bell-crank lever 85 so as to operate the release-bar 83, and thus release the slidable bars 73 and restore the keys, the zero stop-levers, and the blank stop-levers to their normal positions. Each succeeding operation of the machine is the same as that just described, the new figures being added to those shown by the calculating-wheels each time. When the movement of a calculating-wheel 115 brings it back to zero, the lug 167 on the periphery thereof engages its trip-lever 161 and releases the trip-frame 155 therebeneath, so as to remove its stop-arm 158 from the pin 159 of the rack-bar of the next succeeding calculating-wheel and permit the spring of said rack-bar to retract it, turning such succeeding calculating-wheel one number in addition to any movement given it at that stroke as the result of pressing one of its own keys. The following stroke of the operating-lever causes the roller 173 to ride up on the cam-tongue 174 and lift the fallen trip-frames 155 to their normal positions by the lifting-bar 170. Slightly previous to the resetting of the trip-frames the roller 178 on riding up cam-tongue 172 swings the bar 180 so as to advance all bars 110 which have been released, so that their pins 159 may be again engaged by the stop-arms 158. The motion of the actuating-bars 99, due to the removal of their blank stop-levers 152 only, is not sufficient to disturb their calculating-wheels, as the sliding of the rack-bars 110 in said actuating-bars takes up such motion. For the resetting operation it is first necessary to make a full stroke with the operating-lever without having any of the keys depressed in order that link 197 may free its lug from the hook of detent 203 and enable the hooked end of catch-lever 196 to drop, which it cannot do so long as one of the slidable bars presses rearwardly with its lug 202 on the bail-rod 201 during the end of the forward stroke and the beginning of the return stroke of the operating-lever when said detent is removed from said lug by the engagement with lug 205. When the hooked end of catch-lever 196 is dropped out of the path of lug 195, the operating-lever is to be swung backward, rocking shaft 183 by means of arm 182, and thereby swinging lever 186 through the link and arm connection 185 and 184 until said lever is engaged and held by the shoulder 192 of catch-lever 191. This swinging of lever 186 operates the bell-crank lever 190 through link 189 to slide the shaft 116, so that bridge-lever 124 is carried out of line with roller 134 and bridge-lever 125 is brought into line with roller 135. At the same time cam-tongues 174 and 177 are moved out of line with their rollers 173 and 178, respectively, and said rollers travel on the edges of the segments 175 and 176, as the movements produced by these cam-tongues are not required during the resetting operation. Now on a forward movement of the operating-lever instead of the oscillating plate 102 lowering, as before, the roller 135, riding on bridge-lever 125, keeps said oscillating plate in its upper position, permitting the actuating-bars 99 to follow the cross-head 44, rotating their calculating-wheels 115 backward until they are stopped by the cam-lugs 144 thereof engaging the arms 143 of the resetting-bar 142, which brings the calculating-wheels to their zero position. On the return stroke of the operating-handle the oscillating plate 102 is lowered by the roller 135 riding down the front cam 122 of the double cam-frame, and is not raised again by said roller traveling up the other cam 122 until the actuating-bars have come to rest, so the calculating-wheels are not moved from their zero position. This timing effect, as well as that by which at the beginning of the ordinary operating stroke the actuating-bars are completely lowered before they begin their forward movement, is due to the slot connection between the pitmen 41 and 42 and the crank-arms 39 and 40. On the return stroke of the resetting operation the engagement of the cam 92 with roller 91 lowers link 194 and releases catch-lever 191 from lever 186, when the spring 188 of said lever 186 swings it back to its normal position, restoring the shaft 116 and the cam parts carried thereby to their normal positions. During the ordinary operation of the machine each calculating-wheel 115 on its first movement trips its lever 207, with its lug 167, throwing its rod 208 between the blank stop-levers 152, so that at the back stroke of the operating-handle preparatory to the resetting stroke the sliding of shift-bar 209 by the bell-crank and link connection 210 and 211 with levers 186 causes such rods 208 to press the zero stop-levers 147 and the blank stop-levers 152 aside to permit the actuating-bars thereof to follow the cross-head 44, as above described. The backward motion of the operating-lever preparatory to the resetting stroke also raises the end of link 218 through the bell-crank and link connection 219 and 220 with lever 186, so that the forward motion of the operating-lever causes lug 221 on crank-arm 39 to engage same and rock shaft 215, so that its bail-rod 216 swings forward and restores the trip-levers 207 to their normal positions. The swinging of lever 186 at the movement preparatory to the resetting operation, as above referred to, further restores the index-disk 229 to its starting position through the link connection 242 with the lever 241 by causing said lever to bear against the forward projection of the detent 234 to disengage its point from the teeth of the disk 229 and permit the spring 235 thereof to swing it back until lug 239 bears on dog 238, while said dog rests against its confining-lug on plate 228. As the actuating-bars 99 are moved forward they carry with them their type-racks 252, and when brought to a stop by the engagement of one of their lugs 109 with the stems of the keys depressed the type corresponding to the numbers of the keys depressed stand directly beneath the platen 279. When stopped by their zero stop-levers, their zero-type stand on the printing-line. Then the hammers 257 are operated, as before described, to print through the ribbon onto the paper carried by the platen such numbers. During the forward stroke of the operating-lever the platen is given a rotary feed by the gearing in train with gear-wheel 298, and this is not disturbed by moving the carriage-frame 276, because of the toothed cylinder 294 remaining in mesh with pinion 296.

The inking-ribbon 324 is fed from one reel 318 to the other by the motions given to the shaft 309 through the ratchet connections with the crank-arm 39, and when said ribbon has been entirely removed from one reel the gravity-lever 320 thereof swings down, as it is no longer held up by the ribbon wound thereon, and in so doing projects the end of its pin 321 between the teeth of its spur-wheel 323. These teeth being inclined cause the shaft 309 to move lengthwise, changing the connection from one crown-wheel 319 to the other, so as to reverse the direction of feed of the ribbon automatically.

As seen in Figs. 1 and 4, the casing 35 is provided with a perforation showing the index-disk 229 where it passes beneath the opening in index-frame 243, a slot showing the calculating-wheels 115 along the reading-line, slots for lever 90, handle 307, gear 298, and sleeve 59, and has its large top opening partly filled by the shield 98, the remainder thereof being covered by the platen-carriage.

The ordinary operation of the machine results in feeding the paper carried by the platen, printing thereon the number for which the keys have been depressed, adding such number to the number showing on the calculating-wheels and turning the index-disk one tooth. When the resetting operation takes place, the actuating-bars being allowed to travel forward a distance corresponding to the numbers shown by their calculating-wheels will present the type of such numbers to the printing-line and will print such numbers as the sum of all preceding numbers. Should it be desired to print such sum without changing the calculating-wheels to zero, the resetting operation is proceeded with to the end of the forward stroke of the operating-lever, in which position the actuating-bars have been released and have turned their calculating-wheels to zero. Now the lever 90 is drawn forward by the operator, thereby swinging double bell-crank lever 85 and, through link 194, swinging lever 191 to release lever 186, which will be thrown back to its normal position by its spring 188 and slide shaft 116 to its normal position, so that the oscillating plate 102 is not lower during the return stroke, but causes the actuating-bars to turn their calculating-wheels to the position they occupied at the beginning of the operation. When it is desired to repeat a number for which the keys have been depressed, it is only necessary to swing lever 90 backward to engage locking-bar 93 with the stop-pins 94 and operate the handle as many times as the number is desired. The keys which have not been depressed are locked against depression by their stop-pins 94 not being able to pass locking-bar 93. When the keys have been depressed for a number and it is desired to change that number, the lever 90 is drawn forward and the release-bar 83 releases all the slidable bars 73, as before described.

What I claim as my invention is—

1. In a calculating-machine, a series of keys, a series of actuating-bars controlled by the keys, a series of calculating-wheels operated by the actuating-bars, an operating-lever for accomplishing said operation of the actuating-bars when moved in one direction from its normal position, and a resetting means operated by a movement of the operating-lever in another direction from its normal position for restoring the calculating-wheels to their original positions.

2. In a calculating-machine, a series of keys, a series of actuating-bars controlled by the keys, a series of calculating-wheels operated by the actuating-bars when said actuating-bars move in one direction, an operating-lever for accomplishing said operation of the actuating-bars when moved in one direction from its normal position, and a resetting means operated by a movement of the operating-lever in another direction from its normal position for restoring the calculating-wheels to their original positions by rendering the calculating-wheels operative from the actuating-bars only when said actuating-bars move in the other direction.

3. In a calculating-machine, a series of keys, a series of actuating-bars controlled by the keys, a series of calculating-wheels operated by the actuating-bars, means for controlling the engagement between the actuating-bars and the calculating-wheels effecting such engagement at different times when in different positions, and an operating-lever for accomplishing said operation of the actuating-bars when moved in one direction and for changing the position of said means when moved in another direction.

4. In a calculating-machine, a series of keys, a series of actuating-bars controlled by the keys, a series of calculating-wheels operated by the actuating-bars, a double cam producing different effects when in different positions and adapted to control the engagement between the actuating-bars and the calculating-wheels, and an operating-lever for accomplishing said operation of the actuating-bars when moved in one direction and for changing the position of the double cam when moved in another direction.

5. In a calculating-machine, a series of keys, a series of actuating-bars controlled by the keys, a series of calculating-wheels operated by the actuating-bars, a cam-frame having opposite cams producing different effects when in different positions, a part operated by the double cam-frame for controlling the engagement between the actuating-bars and the calculating-wheels, and an operating-lever for accomplishing said operation of the actuating-bars when moved in one direction and for changing the position of the double cam when moved in another direction.

6. In a calculating-machine, a series of keys, a series of actuating-bars controlled by the keys, a series of calculating-wheels operated by the actuating-bars, a cam-frame having opposite cams, an arm controlling the engagement between the actuating-bars and the calculating-wheels and actuated by the cams, a bridge-piece for guiding the arm from the first cam to the second cam, another bridge-piece for guiding the arm from the second cam to the first cam, means for causing the coöperation between the arm and either bridge-piece, and an operating-lever for accomplishing the movement of the actuating-bars.

7. In a calculating-machine, a series of keys, a series of actuating-bars controlled by the keys, a series of calculating-wheels operated by the actuating-bars, a cam-frame having opposite cams, an arm controlling the engagement between the actuating-bars and the calculating-wheels and actuated by the cams, a spring-pressed bridge-lever leading from the first cam to the second cam, another spring-pressed bridge-lever leading from the second cam to the first cam, means for causing the coöperation between the arm and either bridge-lever, and an operating-lever for accomplishing the movement of the actuating-bars.

8. In a calculating-machine, a series of keys, a series of actuating-bars controlled by the keys, a series of calculating-wheels operated by the actuating-bars, a cam-frame having opposite cams, an arm controlling the engagement between the actuating-bars and the calculating-wheels and actuated by the cams, a bridge-piece for guiding the arm from the first cam to the second cam, another bridge-piece for guiding the arm from the second cam to the first cam, means for moving the cam-frame to cause one or the other of the bridge-pieces to coöperate with the arm, and an operating-lever for accomplishing the movement of the actuating-bars.

9. In a calculating-machine, a series of keys, a series of actuating-bars controlled by the keys, a series of calculating-wheels operated by the actuating-bars, a cam-frame having opposite cams, an arm controlling the engagement between the actuating-bars and the calculating-wheels and actuated by the cams, a spring-pressed bridge-lever leading from the first cam to the second cam, another spring-pressed bridge-lever leading from the second cam to the first cam, means for moving the cam-frame to cause one or the other of the bridge-levers to coöperate with the arm, and an operating-lever for accomplishing the movement of the actuating-bars.

10. In a calculating-machine, a series of keys, a series of actuating-bars controlled by the keys, a series of calculating-wheels operated by the actuating-bars, a cam-frame having opposite cams, side posts carried by the cam-frame, spring-actuated bridge-levers pivoted to the side posts, each of the cams normally having one of the bridge-levers bearing on it at one end of said bridge-lever, an arm for controlling the engagement between the actuating-bars and the calculating-wheels and adapted to travel over either bridge-lever and on the cams, means for causing the coöperation between the arm and either of the bridge-levers, and an operating-lever for accomplishing the movements of the actuating-bars.

11. In a calculating-machine, a series of keys, a series of actuating-bars controlled by the keys, a series of calculating-wheels operated by the actuating-bars, a slidable oscillating shaft, a cam-frame carried thereby having opposite cams with an intermediate inactive surface and inactive end surfaces, side posts carried by the cam-frame, spring-actuated bridge-levers pivoted to the side posts, each of the said cams normally having one of the bridge-levers bearing on it at one end of said bridge-lever and adapted to have the other bridge-lever bear on it when swung against its spring-pressure, an arm for controlling the engagement between the actuating-bars and the calculating-wheels and adapted to travel over either bridge-lever from one inactive end surface of the cam-frame to the other and also on the cams and intermediate inactive surface of the cam-frame beneath said bridge-levers, and means for sliding the shaft to change the coaction of the arm from one bridge-lever to the other bridge-lever.

12. In a calculating-machine, a series of keys, a series of actuating-bars controlled by the keys, a series of calculating-wheels operated by the actuating-bars, a slidable oscillating shaft, a cam-frame carried thereby having opposite cams, side posts on the cam-frame, spring-actuated bridge-levers pivoted to the side posts, each of the cams normally having one of the bridge-levers bearing one of its ends thereon, an arm for controlling the engagement between the actuating-bars and the calculating-wheels and adapted to travel over either bridge and on the cams, an operating-lever for accomplishing the movements of the actuating-bars when moved in one direction from its normal position, and means for sliding the shaft operated by a movement of the operating-lever in another direction from its normal position.

13. In a calculating-machine, a series of keys, a series of actuating-bars controlled by the keys, a series of calculating-wheels operated by the actuating-bars, a slidable oscillating shaft, a cam-frame carried thereby having opposite cams, side posts on the cam-frame, spring-retracted bridge-levers pivoted to the side posts, each of the cams normally having one of the bridge-levers bearing one of its ends thereon, an arm for controlling the engagement between the actuating-bars and the calculating-wheels, a roller on each side of the arm adapted to travel over the bridge-levers and on the cams, an operating-lever for accomplishing the movements of the actuating-bars when moved in one direction, and means for sliding the shaft operated by a movement of the operating-lever in another direction to change the operation from one roller on the arm to the other.

14. In a calculating-machine, a series of keys, a series of actuating-bars controlled by the keys, a series of calculating-wheels operated by the actuating-bars, a slidable oscillating shaft, a cam-frame carried thereby having opposite cams, side posts on the cam-frame, spring-actuated bridge-levers pivoted to the side posts, each of the cams normally having one of the bridge-levers bearing one of its ends thereon, an arm for controlling the engagement between the actuating-bars and the calculating-wheels and adapted to travel over either bridge and on the cams, an operating-lever for accomplishing the movements of the actuating-bars when moved in one direction, a second shaft having a pair of arms, one arm in position to be swung by the operating-lever when said operating-lever is moved in another direction, a bell-crank lever capable of sliding the first-named shaft and a connection between the bell-crank lever and the other arm of the second shaft.

15. In a calculating-machine, a series of keys, a series of actuating-bars controlled by the keys, a series of calculating-wheels operated by the actuating-bars, a slidable oscillating shaft, a cam-frame carried thereby having opposite cams, side posts on the cam-frame, spring-actuated bridge-levers pivoted to the side posts, each of the cams normally having one of the bridge-levers bearing one of its ends thereon, an arm for controlling the engagement between the actuating-bars and the calculating-wheels and adapted to travel over either bridge and on the cams, an operating-lever for accomplishing the movements of the actuating-bars when moved in one direction, a second shaft having a pair of arms, one arm in position to be swung by the operating-lever when said operating-lever is moved in another direction, a bell-crank lever capable of sliding the first-named shaft, a spring-operated lever having connection with the bell-crank lever and with the other arm of the second shaft, a catch for holding said lever in one position against the action of its spring, and means for releasing said catch.

16. In a calculating-machine, a series of keys, a series of actuating-bars controlled by the keys, a series of calculating-wheels operated by the actuating-bars, a shaft, crank-arms carried thereby, pitmen pivoted to the crank-arms, a cross-head connecting the pitmen and adapted to engage the actuating-bars, an operating-lever loosely mounted on the shaft, a plate carried by the operating-lever having an abutting engagement with one of the crank-arms, a second shaft by aid of which the resetting of the calculating-wheels is accomplished, and an arm on said second shaft in the path of the plate when said plate is moved away from its abutting engagement with the crank-arm.

17. In a calculating-machine, a series of keys, a series of actuating-bars controlled by the keys, a series of calculating-wheels operated by the actuating-bars, a shaft, crank-arms carried thereby, pitmen pivoted to the crank-arms, a cross-head connecting the pitmen and adapted to engage the actuating-bars, an operating-lever loosely mounted on the shaft, a plate carried by the operating-lever having an abutting engagement with one of the crank-arms, a second shaft, means operated thereby for controlling the engagement of the actuating-bars with the calculating-wheels and producing different effects in different positions of the second shaft, a segmental gear on the second shaft, a rack-arm pivoted on one of the crank-arms and meshing with the segmental gear, means for sliding the second shaft, a third shaft having connection with the means for sliding the second shaft, and an arm on the third shaft in position to be engaged by the plate when said plate is moved away from its abutting engagement with the crank-arm.

18. In a calculating-machine, a series of keys, a series of actuating-bars controlled by the keys, a series of calculating-wheels operated by the actuating-bars, a shaft, crank-arms carried thereby, pitmen pivoted to the crank-arms, a cross-head connecting the pitmen and adapted to engage the actuating-bars, an operating-lever loosely mounted on the shaft, a plate carried by the operating-lever, a lug on one of the crank-arms, a shoulder on the plate normally held by spring-pressure against the lug on the crank-arm, a lug on the plate adapted to be brought into engagement with the crank-arm when the operating-lever is swung backward and a second shaft by the aid of which the resetting operation of the calculating-wheels is accomplished, and an arm on said second shaft in the path of the plate when said plate is moved by the backward stroke of the operating-lever.

19. In a calculating-machine, a series of keys, a series of slidable bars operated by the keys, a series of actuating-bars controlled by the keys, a series of calculating-wheels operated by the actuating-bars, a shaft, crank-arms carried thereby, a cross-head having connection with the crank-arms and engaging the ends of the actuating-bars, an operating-lever loosely mounted on the shaft, a plate carried by the operating-lever having an abutting engagement with one of the crank-arms, a second shaft, means operated thereby for controlling the engagement of the actuating-bars with the calculating-wheels and producing different effects in different positions of the second shaft, means for operatively connecting the second shaft with the first-named shaft, means for sliding the second shaft, a third shaft having connection with the means for sliding the second shaft, an arm on the third shaft in position to be engaged by the plate when said plate is moved away from its abutting engagement with the crank-arm, and means controlled by the slidable bars for preventing the movement of the arm by the plate.

20. In a calculating-machine, a series of keys, a series of slidable bars operated by the keys, a series of actuating-bars controlled by the keys, a series of calculating-wheels operated by the actuating-bars, a shaft, crank-arms carried thereby, a cross-head having connection with the crank-arms and engaging the ends of the actuating-bars, an operating-lever loosely mounted on the shaft, a plate carried by the operating-lever having an abutting engagement with one of the crank-arms, a second shaft, means operated thereby for controlling the engagement of the actuating-bars with the calculating-wheels and producing different effects in different positions of the second shaft, means for operatively connecting the second shaft with the first-named shaft, means for sliding the second shaft, a third shaft having connection with the means for sliding the second shaft, an arm on the third shaft in position to be engaged by the plate when said plate is moved away from its abutting engagement with the crank-arm, a bail-rod engaged by the slidable bars when operated by the keys, and a catch-lever in connection with the bail-rod and being capable of preventing the movement of the arm by the plate.

21. In a calculating-machine, a series of keys, a series of slidable bars operated by the keys, a series of actuating-bars controlled by the keys, a series of calculating-wheels operated by the actuating-bars, a shaft, crank-arms carried thereby, pitmen pivoted to the crank-arms, a cross-head connecting the pitmen and engaging the ends of the actuating-bars, an operating-lever loosely mounted on the shaft, a plate carried by the operating-lever having an abutting engagement with one of the crank-arms, a second shaft, means operated thereby for controlling the engagement of the actuating-bars with the calculating-wheels and producing different effects in different positions of the second shaft, means for operatively connecting the second shaft with the first-named shaft, means for sliding the second shaft, a third shaft having connection with the means for sliding the second shaft, an arm on the third shaft in position to be engaged by the plate when said plate is moved away from its abutting engagement with the crank-arm, a bail-rod engaged by the slidable bars when operated by the keys, a catch-lever capable of engaging the arm against movement by the plate, a crank on the bail-rod, a link connecting the crank with the catch-lever, a spring-operated detent for engaging the link, and a lug on one of the pitmen for striking the detent to disengage same from the link.

22. In a calculating-machine, a series of keys, a series of slidable bars operated by the keys, a series of actuating-bars controlled by the keys, a series of calculating-wheels operated by the actuating-bars, a shaft, crank-arms carried thereby, pitmen pivoted to the crank-arms, a cross-head connecting the pitmen and engaging the ends of the actuating-bars, an operating-lever loosely mounted on the shaft, a plate carried by the operating-lever having an abutting engagement with one of the crank-arms, a second shaft, means operated thereby for controlling the engagement of the actuating-bars with the calculating-wheels and producing different effects in different positions of the second shaft, means for operatively connecting the second shaft with the first-named shaft, means for sliding the second shaft, a third shaft having connection with the means for sliding the second shaft, an arm on the third shaft in position to be engaged by the plate when said plate is moved away from its abutting engagement with the crank-arm, a catch-lever, means on one of the pitmen for engagement by said catch-lever, a release-lever engaging the catch-lever and holding it out of engagement with the means on the pitman when said release-lever is in one position and permitting such engagement when in another position, means for holding the release-lever in its different positions, and means on the pitman for changing the position of the release-lever.

23. In a calculating-machine, a series of keys, a series of actuating-bars controlled by the keys, a series of calculating-wheels operated by the actuating-bars, an oscillating plate supporting the ends of the actuating-bars and adapted to bring them into and out of engagement with the calculating-wheels, and a bar supported upon the oscillating plate and located above the actuating-bars and adapted to guide said actuating-bars.

24. In a calculating-machine, a series of keys, a series of actuating-bars controlled by the keys, a series of calculating-wheels, pinions on the calculating-wheels, slidable spring-actuated rack-bars carried by the actuating-bars, means for causing the rack-bars to engage and disengage the pinions, an operating-lever for giving motion to the actuating-bars, a shaft receiving motion from the operating-lever, a segment on the shaft, a spring-pressed cam-tongue carried by the segment, a pivoted bar receiving motion from the cam-tongue and adapted to engage the rack-bars and slide them on the actuating-bars against their spring action, and means for retaining the rack-bars in the position in which they are placed by the pivoted bar.

25. In a calculating-machine, a series of keys, a series of actuating-bars controlled by the keys, a series of calculating-wheels, pinions on the calculating-wheels, slidable spring-actuated rack-bars carried by the actuating-bars, means for causing the rack-bars to engage and disengage the pinions, an operating-lever for giving motion to the actuating-bars, a shaft receiving motion from the operating-lever, a segment on the shaft, a spring-pressed cam-tongue carried by the segment, a series of trip-frames, trip-levers supporting said trip-frames, lugs on the calculating-wheels for throwing the trip-levers to release the trip-frames, an arm on each trip-frame holding the rack of the next actuating-bar in its normal position, and a lift-bar receiving motion from the cam-tongue and adapted to restore the trip-frames to their normal positions.

26. In a calculating-machine, a series of keys, a series of actuating-bars controlled by the keys, a series of calculating-wheels, pinions on the calculating-wheels, slidable spring-actuated rack-bars carried by the actuating-bars, means for causing the rack-bars to engage and disengage the pinions, an operating-lever for giving motion to the actuating-bars, a shaft receiving motion from the operating-lever, a segment on the shaft, a spring-pressed cam-tongue carried by the segment, a series of trip-frames, trip-levers supporting said trip-frames, lugs on the calculating-wheels for throwing the trip-levers to release the trip-frames, an arm on each trip-frame holding the rack of the next actuating-bar in its normal position, a lift-bar receiving motion from the cam-tongue and adapted to restore the trip-frames to their normal positions, a second segment on the shaft, a spring-pressed cam-tongue carried by the second segment, and a pivoted bar receiving motion from said cam-tongue of the second segment and adapted to engage the rack-bars and slide them on the actuating-bars against their spring actions to their normal positions to be again engaged by the arms of the trip-levers.

27. In a calculating-machine, a series of keys, a series of actuating-bars controlled by the keys, a series of calculating-wheels, pinions on the calculating-wheels, slidable spring-actuated rack-bars carried by the actuating-bars, means for causing the rack-bars to engage and disengage the pinions, an operating-lever for giving motion to the actuating-bars, a shaft receiving motion from the operating-lever, a segment on the shaft, a spring-pressed cam-tongue carried by the segment, a series of trip-frames, trip-levers supporting said trip-frames, lugs on the calculating-wheels for throwing the trip-levers to release the trip-frames, an arm on each trip-frame holding the rack of the next actuating-bar in its normal position, a lift-bar receiving motion from the cam-tongue and adapted to restore the trip-frames to their normal positions, a second segment on the shaft, a spring-pressed cam-tongue carried by the second segment, and a pivoted bar receiving motion from said cam-tongue of the second segment and adapted to engage the rack-bars and slide them on the actuating-bars against their spring actions to their normal positions to be again engaged by the arms of the trip-levers, said second segment being so arranged on the shaft that the operation of its cam-tongue takes place in advance of the operation of the cam-tongue of the other segment.

28. In a calculating-machine, a series of keys, a series of slidable bars operated by the keys, a series of actuating-bars controlled by the keys, a printing mechanism controlled by the actuating-bars, stop-levers for normally preventing the movement of the actuating-bars but being movable from their position by the operation of the slidable bars, means for causing the first two stop-levers to move in unison, and means for causing the movement of any of the other stop-levers to simultaneously move all of the other stop-levers on one side thereof.

29. In a calculating-machine, a series of keys, a series of slidable bars operated by the keys, a series of actuating-bars controlled by the keys, a printing mechanism controlled by the actuating-bars, stop-levers for normally preventing the movement of the actuating-bars but being moved from their position by the operation of the slidable bars, a sliding block to which the first two stop-levers are connected, and separate abutting sliding blocks connected to each of the other stop-levers.

30. In a calculating-machine, a series of keys, a series of actuating-bars controlled by the keys, a printing mechanism controlled by the actuating-bars, stop-levers for normally preventing the movement of the actuating-bars, means for causing the movement of any stop-lever to produce the movement of all stop-levers on one side thereof, a shift-bar, rods projecting from the shift-bar and extending between the stop-levers, and means for operating the shift-bar to move the stop-levers.

31. In a calculating-machine, a series of keys, a series of actuating-bars controlled by the keys, a series of calculating-wheels operated by the actuating-bars, a printing mechanism controlled by the actuating-bars, stop-levers for normally preventing the movement of the actuating-bars, means for causing the movement of any stop-lever to produce the movement of all stop-levers on one side thereof, a shift-bar, rods carried by the shift-bar and capable of being projected between the stop-levers by control of the calculating-wheels, and means for operating the shift-bar to move the stop-levers by the projected ends of the rods.

32. In a calculating-machine, a series of keys, a series of actuating-bars controlled by the keys, a series of calculating-wheels operated by the actuating-bars, a printing mechanism controlled by the actuating-bars, stop-levers for normally preventing the movement of the actuating-bars, means for causing the movement of any stop-lever to produce the movement of all stop-levers on one side thereof, a shift-bar, rods carried by the shift-bar, trip-levers to which the rods are connected, lugs on the calculating-wheels for engaging the trip-levers to project the ends of the rods between the stop-levers, and means for operating the shift-bar to move the stop-levers by the projected ends of the rods.

33. In a calculating-machine, a series of keys, a series of actuating-bars controlled by the keys, a series of calculating-wheels operated by the actuating-bars, a printing mechanism controlled by the actuating-bars, stop-levers for normally preventing the movement of the actuating-bars, means for causing the movement of any stop-lever to produce the movement of all stop-levers on one side thereof, a shift-bar, rods carried by the shift-bar, trip-levers to which the rods are connected, lugs on the calculating-wheels for engaging the trip-levers to project the ends of the rods between the stop-levers, means for operating the shift-bar to move the stop-levers by the projected ends of the rods, and spring-pressed pawls for holding the trip-levers in either position.

34. In a calculating-machine, a series of keys, a series of actuating-bars controlled by the keys, a series of calculating-wheels operated by the actuating-bars, a printing mechanism controlled by the actuating-bars, stop-levers for normally preventing the movement of the actuating-bars, means for causing the movement of any stop-lever to produce the movement of all stop-levers on one side thereof, a shift-bar, rods carried by the shift-bar, trip-levers to which the rods are connected, lugs on the calculating-wheels for engaging the trip-levers to project the ends of the rods between the stop-levers, means for operating the shift-bar to move the stop-levers by the projected ends of the rods, spring-pressed pawls for holding the trip-levers in either position, an operating-lever for giving motion to the actuating-bars, and means controlled by the movements of the operating-lever for returning the trip-levers to their normal positions.

35. In a calculating-machine, a series of keys, a series of actuating-bars controlled by the keys, a printing mechanism controlled by the actuating-bars, calculating-wheels operated by the actuating-bars, stop-levers for normally preventing the movement of the actuating-bars, means for causing the movement of any stop-lever to produce the movement of the stop-levers on one side thereof, a shift-bar, rods carried by the shift-bar, trip-levers to which the rods are connected, lugs on the calculating-wheels for engaging the trip-levers to project the ends of the rods between the stop-levers, an operating-lever, a shaft operated thereby when said operating-lever is moved in one direction, crank-arms on the shaft, pitmen connected to the crank-arms, a cross-head connecting the pitmen and engaging the actuating-bars, a second shaft receiving motion from the operating-lever when said operating-lever is moved in another direction, a spring-actuated lever connected with the second shaft, a catch-lever for holding said spring-actuated lever in the position to which it is moved by the second shaft, means on one of the pitmen for releasing the catch on the return motion of the pitman, a bail-rod, a connection between the bail-rod and the spring-actuated lever adapted to be brought into the path of one of the crank-arms on the movement of the second shaft so as to be struck by said crank-arm and move the bail-rod to restore the trip-levers to their normal positions, and means operated by said spring-actuated lever for operating the shift-rod to move the stop-levers by the projected ends of the rods.

36. In a calculating-machine, a series of keys, a series of actuating-bars controlled by the keys, a printing mechanism controlled by the actuating-bars, calculating-wheels operated by the actuating-bars, stop-levers for normally preventing the movement of the actuating-bars, means for causing the movement of any stop-lever to produce the movement of the stop-levers on one side thereof, a shift-bar, rods carried by the shift-bar, trip-levers to which the rods are connected, lugs on the calculating-wheels for engaging the trip-levers to project the ends of the rods between the stop-levers, an operating-lever, a shaft operated thereby when said operating-lever is moved in one direction, crank-arms on the shaft, pitmen connected to the crank-arms, a cross-head connecting the pitmen and engaging the actuating-bars, a second shaft receiving motion from the operating-lever when said operating-lever is moved in another direction, a spring-actuated lever connected with the second shaft, a catch-lever for holding said spring-actuated lever in the position to which it is moved by the second shaft, means on one of the pitmen for releasing the catch on the return motion of the pitman, a bail-rod, a bell-crank lever having connection with the spring-actuated lever, a crank on the bail-rod, a link connecting the crank with the bell-crank lever and adapted to be swung by said bell-crank lever into a position to be engaged by one of the crank-arms, and means operated by the said spring-actuated lever for operating the shift-rod to move the stop-levers by the projecting ends of the rods.

37. In a calculating-machine, a series of keys, a series of actuating-bars controlled by the keys, a printing mechanism controlled by the actuating-bars, calculating-wheels operated by the actuating-bars, stop-levers for normally preventing the movement of the actuating-bars, means for causing the movement of any stop-lever to produce the movement of the stop-levers on one side thereof, a shift-bar, rods carried by the shift-bar, trip-levers to which the rods are connected, lugs on the calculating-wheels for engaging the trip-levers to project the ends of the rods between the stop-levers, an operating-lever, a shaft operated thereby when said operating-lever is moved in one direction, crank-arms on the shaft, pitmen connected to the crank-arms, a cross-head connecting the pitmen and engaging the actuating-bars, a second shaft receiving motion from the operating-lever when said operating-lever is moved in another direction, a spring-actuated lever connected with the second shaft, a catch-lever for holding said spring-actuated lever in the position to which it is moved by the second shaft, means on one of the pitmen for releasing the catch on the return motion of the pitman, a bail-rod, a connection between the bail-rod and the spring-actuated lever capable of engagement with one of the crank-arms, a second bell-crank lever having a link connection with the spring-actuated lever, and a spring connecting said second bell-crank lever with the shift-bar.

38. In a calculating-machine, a series of keys, a series of spring-operated actuating-bars controlled by the keys, spring-actuated rack-bars having a limited sliding movement on the actuating-bars, an operating-lever for moving the actuating-bars, calculating-wheels, pinions thereon capable of engagement with the rack-bars, means for timing the engagement between the pinions and the rack-bars, means controlled by each calculating-wheel for holding the rack-bar of the next calculating-wheel against its spring action, stop-levers normally preventing the movement of the actuating-bars, means for causing the movement of any stop-lever to produce the movement of the stop-levers on one side thereof, means controlled by the movements of the calculating-wheels capable of moving the stop-levers, means for locking the calculating-wheels against rotation, and printing mechanism controlled by the actuating-bars and adapted to print zero as the result of the movement of each actuating-bar when released by its stop-lever at the time its calculating-wheel is locked, which movement is due to the said limited sliding movement of the rack-bar thereon.

39. In a calculating-machine, an operating-lever, a pivoted plate receiving motion therefrom when said operating-lever is moved in one direction, a spring-pressed pawl carried by the plate, a toothed index-wheel having a spring rotary action and adapted to be turned against such spring action by having its teeth engaged by the pawl during the swing of the plate, a spring-pressed detent normally engaging the teeth of the index-disk to prevent the disk turning as the result of said spring rotary action, a lug carried by the disk, a dog engaged by the lug and carried into engagement with the detent to force said detent out of engagement with the teeth of the disk and hold it until said lug by the rotation of the disk under its spring action strikes the dog on the other side thereof and knocks it out of engagement with the detent, a lever actuated by the operating-lever when moved in another direction and adapted to press the detent out of engagement with the teeth of the index-disk, and means for limiting the swing of the dog and so stopping the movement of the disk when released by the lug engaging said dog.

40. In a calculating-machine, a series of keys, a series of slidable bars operated by the keys, calculating means controlled by the keys, a series of stops adapted to engage the slidable bars and retain them in their operated position, a release-bar for removing the stops from engagement with the slidable bars, a release-lever for operating the release-bar, a locking-bar, and a thumb-lever having a link connection with the locking-bar whereby said locking-bar is caused to lock all of the slidable bars when said thumb-lever is swung in one direction, said release-lever being adapted to be operated by the thumb-lever when said thumb-lever is swung in the other direction.

41. In a calculating-machine, a keyboard, an operating-lever, calculating mechanism controlled by the keyboard and operated by the operating-lever, a printing mechanism controlled by the calculating mechanism and operated by the operating-lever, a slidable carriage, a platen carried thereby, gearing carried by the carriage for rotating the platen, a toothed cylinder extending parallel with the line of movement of the carriage and meshing with gearing of the carriage, and means for operating the toothed cylinder by the movements of the operating-lever.

42. In a calculating-machine, a frame, a keyboard, an operating-lever, calculating mechanism controlled by the keyboard and operated by the operating-lever, a printing mechanism controlled by the calculating mechanism and operated by the operating-lever, a slidable carriage, a platen carried thereby, gearing carried by the carriage for rotating the platen, a toothed cylinder extending parallel with the line of movement of the carriage and meshing with the gearing of the carriage, a crank-arm operated by the operating-lever, a lever having means for retaining it in its different positions, means for changing the position of said lever, a second lever fulcrumed to the first lever, and having a sliding connection with the crank-arm, a gearing carried by the carriage for turning the platen, a gearing on the frame in mesh with the gearing on the carriage, a crank having a rigid connection with the gearing, and a link connecting the crank with the second lever.

43. In a calculating-machine, a frame, a keyboard, an operating-lever, calculating mechanism controlled by the keyboard and operated by the operating-lever, a printing mechanism controlled by the calculating mechanism and operated by the operating-lever, a carriage guide-frame mounted on the frame, a carriage slidable in guideways of said guide-frame, a platen carried by the carriage, a rod journaled in the carriage, lugs on said rod adapted to bear upon the carriage guide-frame, and a lever carried by the rod and normally pressed upon by the platen to lock the carriage against sliding.

44. In a calculating-machine, a series of keys, a series of actuating-bars controlled by the keys, an operating-lever for operating the actuating-bars, a series of type-racks carried by the actuating-bars, a series of spring-operated hammers, stop-shoulders carried by the actuating-bars, means operated by the operating-lever for swinging the hammers against their spring action, and means controlled by the operating-lever for releasing the hammers to cause them to strike the stop-shoulders of all such actuating-bars as have not been moved from their normal positions and to strike the type of the type-racks of such actuating-bars as have been moved from their normal positions.

45. In a calculating-machine, a series of keys, a series of actuating-bars controlled by the keys, an operating-lever for operating the actuating-bars, a series of type-racks carried by the actuating-bars, a hammer-frame, a shaft therein, a series of spring-actuated hammers pivotally mounted on said shaft, trip-levers depending from the hammers, a swinging bar operated by the operating-lever and swinging said hammers by their tripping-levers against the spring action of said hammers, and a trigger-plate operated by the operating-lever and adapted to engage the trip-levers when so swung by the swinging bar and support them while the swinging bar is receding and to release them to cause the hammers to strike the type of the rack-bars.

In testimony whereof I affix my signature in presence of two witnesses.

JAMES MALLMANN.

Witnesses:
 LOUIS GENNBURG,
 GEO. M. DIEHL.